United States Patent
Tawa et al.

(10) Patent No.: US 6,890,228 B2
(45) Date of Patent: May 10, 2005

(54) OUTBOARD MOTOR EQUIPPED WITH WATER-COOLED ENGINE

(75) Inventors: Hiroki Tawa, Saitama (JP); Tatsuya Kuroda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/674,812

(22) Filed: Oct. 1, 2003

(65) Prior Publication Data

US 2004/0116009 A1 Jun. 17, 2004

(30) Foreign Application Priority Data

Oct. 11, 2002 (JP) .................................. 2002-299002

(51) Int. Cl.⁷ ............................................. B63H 21/10
(52) U.S. Cl. ................... 440/88 J; 440/89 C
(58) Field of Search ............................ 440/88 C, 88 G, 440/88 J, 89 B, 89 C, 89 G

(56) References Cited

U.S. PATENT DOCUMENTS 4,082,068 A * 4/1978 Hale ....................... 123/41.02
5,222,464 A * 6/1993 Oyaizu ................. 123/41.82 R
6,077,137 A * 6/2000 Hahn ....................... 440/89 R
6,305,332 B1 * 10/2001 Nishi et al. ............... 123/41.29

FOREIGN PATENT DOCUMENTS

| JP | 9-41960 | 2/1997 |
|---|---|---|
| JP | 10-212948 | 8/1998 |

* cited by examiner

Primary Examiner—Stephen Avila
(74) Attorney, Agent, or Firm—Arent Fox, PLLC.

(57) ABSTRACT

An outboard motor equipped with a water-cooled engine includes an exhaust manifold cooling water jacket for cooling an exhaust manifold for discharging to the outside exhaust gas from a combustion chamber, the exhaust manifold cooling water jacket being supplied with cooling water from a cooling water pump. A water outlet provided in the highest part of the exhaust manifold cooling water jacket is made to communicate with a water check outlet for confirming the circulation of cooling water due to operation of the cooling water pump. Thus, it is possible to reliably discharge air residing within the exhaust manifold cooling water jacket through the water check outlet. Since the water check outlet is used as an opening for discharging air, it is unnecessary to provide a special air outlet.

6 Claims, 19 Drawing Sheets

FIG.8 BOTTOM OF PUMP BODY

OUTBOARD MOTOR EQUIPPED WITH WATER-COOLED ENGINE

BACKGROUND OF THE INVENTION

1. Field of the Invention

The present invention relates to an outboard motor equipped with a water-cooled engine that includes an exhaust manifold cooling water jacket for cooling an exhaust manifold for discharging exhaust gas from a combustion chamber to the outside, the exhaust manifold cooling water jacket being supplied with cooling water from a cooling water pump.

2. Description of the Related Art

As an engine for an outboard motor, a water-cooled engine is generally used. It is known from Japanese Patent Application Laid-open Nos. 9-41960 and 10-212948 that cooling is conducted by means of an exhaust manifold cooling water jacket formed so as to cover an exhaust manifold, which is one of high temperature members surrounding the engine.

However, since either of the above-mentioned conventional arrangements includes a pressure relief valve on the downstream side of the exhaust manifold cooling water jacket, if the pressure relief valve closes when the engine runs continuously at low speed, air residing within the exhaust manifold cooling water jacket cannot be smoothly discharged to the outside, and there is a possibility that a local heat trap might be generated.

SUMMARY OF THE INVENTION

The present invention has been achieved in view of the above-mentioned circumstances, and it is an object thereof to reliably discharge air residing within an exhaust manifold cooling water jacket of a water-cooled engine of an outboard motor.

In order to accomplish the above object, a first aspect of the present invention provides an outboard motor equipped with a water-cooled engine that includes an exhaust manifold cooling water jacket for cooling an exhaust manifold of exhaust passage means for discharging to the outside exhaust gas from a combustion chamber, the exhaust manifold cooling water jacket being supplied with cooling water from a cooling water pump, wherein a water outlet is provided in the highest part of the exhaust manifold cooling water jacket, and communicates with an opening that communicates with the outside at least when the engine is running.

In accordance with this arrangement, since the water outlet provided in the highest part of the exhaust manifold cooling water jacket is made to communicate with the opening that communicates with the outside at least when the engine is running, air residing within the exhaust manifold cooling water jacket can be reliably discharged from the opening, thereby preventing the part where air resides from being overheated.

Furthermore, in accordance with a second aspect of the present invention, in addition to the first aspect, there is provided an outboard motor equipped with a water-cooled engine wherein the opening is a water check outlet for confirming the circulation of cooling water.

In accordance with this arrangement, since the water check outlet for confirming the circulation of cooling water due to operation of the cooling water pump is utilized as the opening with which the water outlet provided in the highest part of the exhaust manifold cooling water jacket communicates, it is possible to discharge air residing within the exhaust manifold cooling water jacket through the water check outlet, thus making it unnecessary to provide a special opening.

Moreover, in accordance with a third aspect of the present invention, in addition to the first aspect, there is provided an outboard motor equipped with a water-cooled engine that includes an exhaust manifold cooling water jacket for cooling an exhaust manifold that forms exhaust passage means for discharging to the outside exhaust gas from a combustion chamber, and a combustion chamber cooling water jacket that is connected to a downstream side of the exhaust manifold cooling water jacket and that cools the surroundings of the combustion chamber, these water jackets being supplied with cooling water from a cooling water pump, wherein a water outlet is provided in the exhaust manifold cooling water jacket, and communicates with an opening that communicates with the outside at least when the engine is running, and wherein flow rate control means for controlling the flow rate of the cooling water is provided in the combustion chamber cooling water jacket.

In accordance with this arrangement, since the water outlet provided in the exhaust manifold cooling water jacket is made to communicate with the opening that communicates with the outside at least when the engine is running, air residing within the exhaust manifold cooling water jacket can be discharged through the opening, thereby preventing the part where air resides from being overheated. Furthermore, since the cooling water flow rate control means is provided in the combustion chamber cooling water jacket, which is connected to the downstream side of the exhaust manifold cooling water jacket, the flow rate of cooling water flowing through the exhaust manifold cooling water jacket can be controlled by the flow rate control means. As a result, it is unnecessary to make the opening unnecessarily large in order to maintain the flow rate of cooling water flowing through the exhaust manifold cooling water jacket, thus reducing the amount of cooling water wastefully discharged and thereby reducing the load on the cooling water pump.

Furthermore, in accordance with a fourth aspect of the present invention, in addition to any one of the first to third aspects, there is provided an outboard motor equipped with a water-cooled engine wherein the exhaust manifold is provided on one of the left and right sides of the outboard motor, and the opening is provided on the other side of the outboard motor.

In accordance with this arrangement, since the exhaust manifold and the opening are provided on left and right sides of the outboard motor, even when the opening is positioned lower than the exhaust manifold, enlarging the distance between the exhaust manifold and the opening reduces the downward slope, thereby smoothly pushing air within the exhaust manifold toward the opening.

An engine compartment exhaust passage of an embodiment corresponds to the exhaust passage means of the present invention, a coupling 61e of the embodiment corresponds to the water outlet of the present invention, a water check outlet 66 of the embodiment corresponds to the opening of the present invention, a first thermostat 84 of the embodiment corresponds to the flow rate control means of the present invention, and a cylinder block cooling water jacket JB of the embodiment corresponds to the combustion chamber cooling water jacket of the present invention.

The above-mentioned object, other objects, characteristics, and advantages of the present invention will

BRIEF DESCRIPTION OF THE DRAWINGS

FIG. 1 is an overall side view of an outboard motor.

FIG. 2 is an enlarged cross-sectional view at line 2—2 in FIG. 1.

FIG. 3 is an enlarged cross-sectional view at line 3—3 in FIG. 2.

FIG. 4 is an enlarged view from arrow 4 in FIG. 2.

FIG. 5 is a view from arrow 5 in FIG. 4.

FIG. 6 is an enlarged cross-sectional view of an essential part in FIG. 1.

FIG. 7 is an enlarged view from an arrowed line 7—7 in FIG. 1 (top view of a mount case).

FIG. 8 is an enlarged view from an arrowed line 8—8 in FIG. 1 (bottom view of a pump body).

FIG. 9 is an enlarged view from an arrowed line 9—9 in FIG. 1 (bottom view of a subassembly of a block, etc.).

FIG. 10 is an enlarged view of an exhaust manifold.

FIG. 11 is an enlarged view of a connection between the exhaust manifold and an exhaust guide.

FIG. 12 is a view from an arrowed line 12—12 in FIG. 11 (plan view of the exhaust guide).

FIG. 13 is a cross-sectional view at line 13—13 in FIG. 11.

FIG. 14 is an enlarged view from an arrowed line 14—14 in FIG. 1.

FIG. 15 is an enlarged view from an arrowed line 15—15 in FIG. 1.

FIG. 16 is an enlarged cross-sectional view at line 16—16 in FIG. 15.

FIG. 17 is a cross-sectional view at line 17—17 in FIG. 16.

FIG. 18 is a cross-sectional view at line 18—18 in FIG. 16.

FIG. 19 is a circuit diagram of an engine cooling system.

DESCRIPTION OF THE PREFERRED EMBODIMENT

Figure 1:
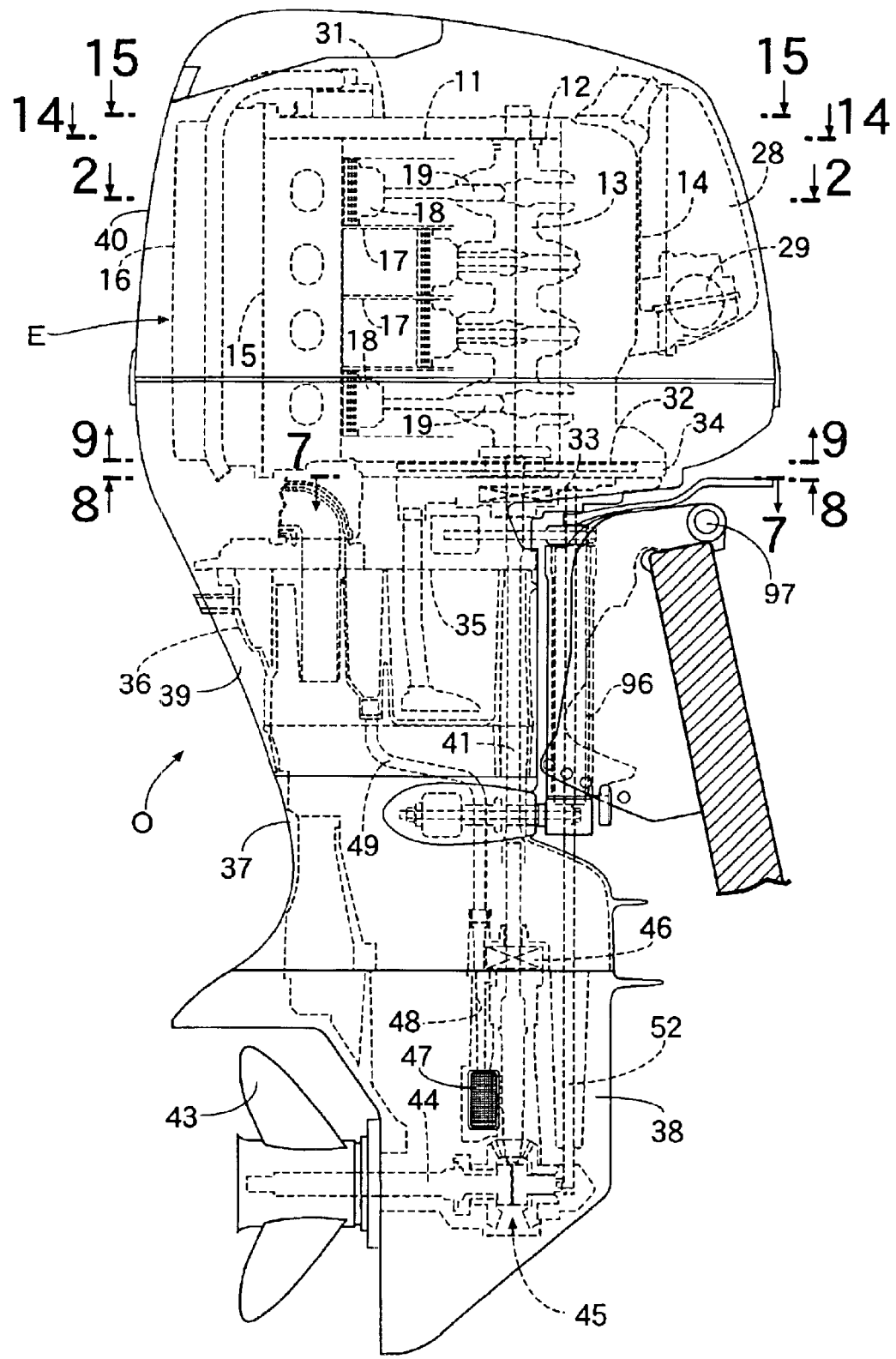
FIG. 1 to FIG. 19 illustrate one embodiment of the present invention.
Figure 2:
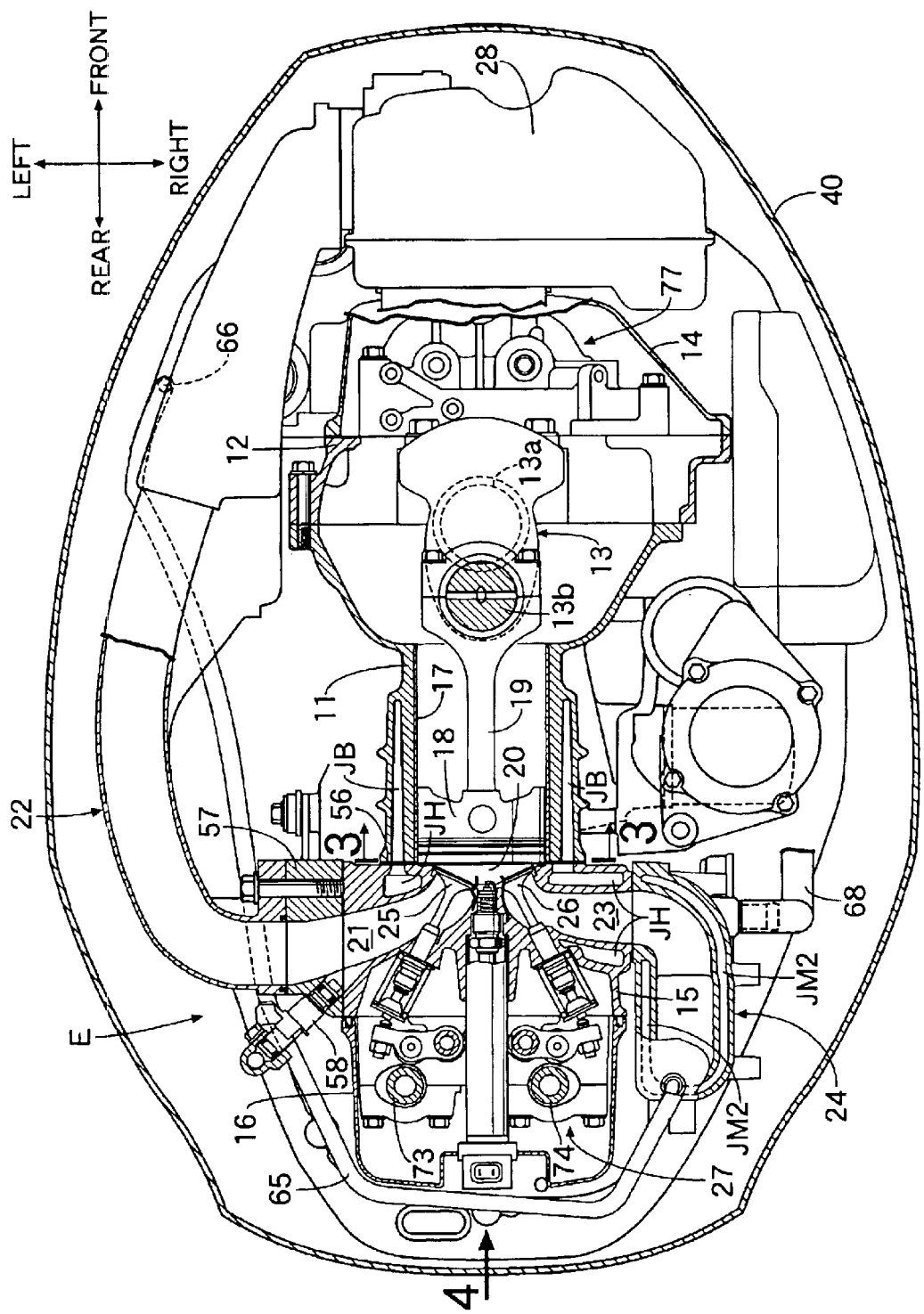
Figure 3:
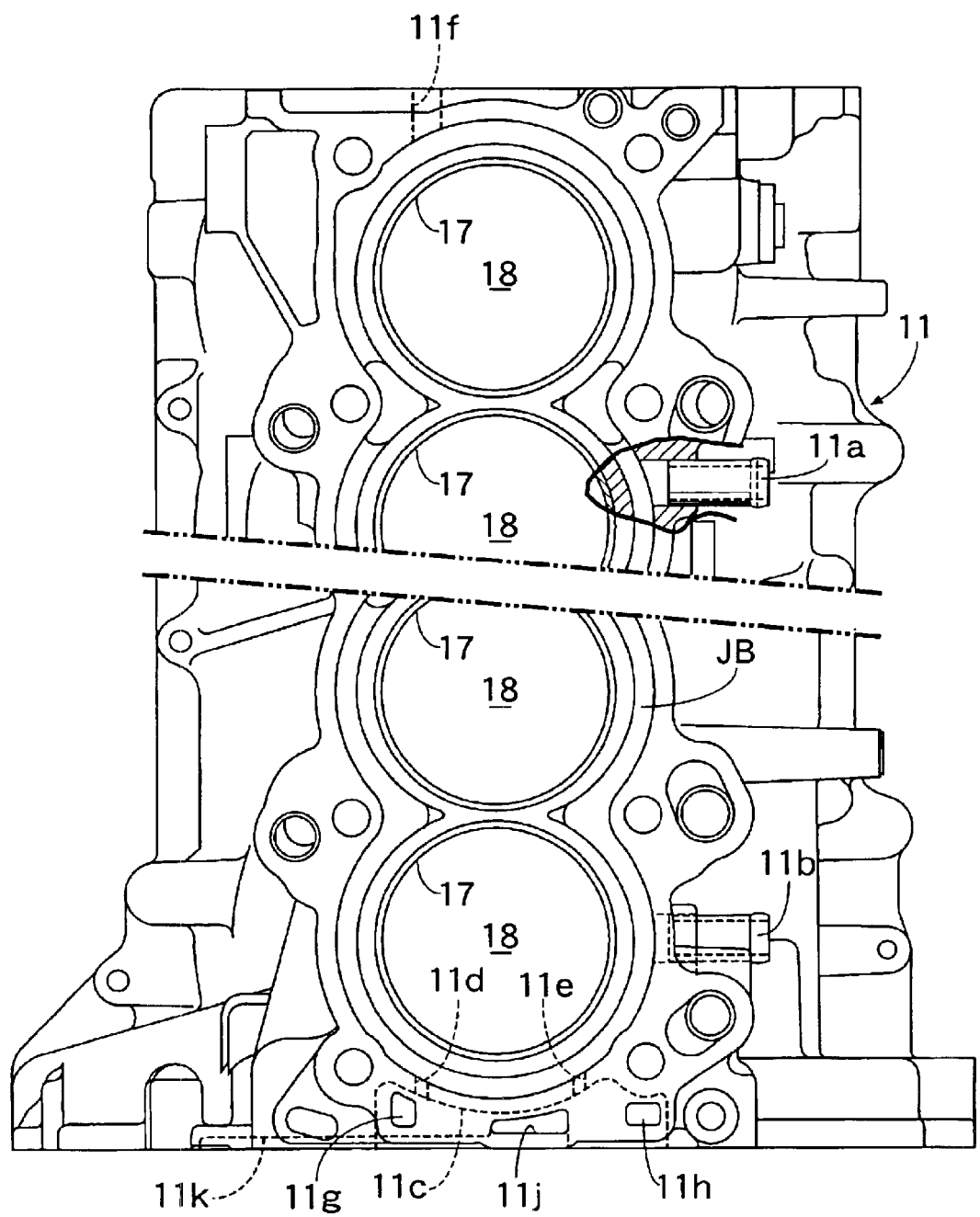

As shown in FIGS. 1 to 3, an outboard motor O is mounted on a hull so that a steering movement can be carried out in the left and right directions around a steering shaft 96, and a tilting movement can be carried out in the vertical direction around a tilt shaft 97. An inline four-cylinder four-stroke water-cooled vertical engine E mounted in an upper part of the outboard motor O includes a cylinder block 11, a lower block 12 joined to a front face of the cylinder block 11, a crankshaft 13 disposed in a substantially vertical direction and supported so that journals 13a are held between the cylinder block 11 and the lower block 12, a crankcase 14 joined to a front face of the lower block 12, a cylinder head 15 joined to a rear face of the cylinder block 11, and a head cover 16 joined to a rear face of the cylinder head 15. Four sleeve-form cylinders 17 are surround-cast in the cylinder block 11, and pistons 18 are slidably fitted within the cylinders 17 and connected to crankpins 13b of the crankshaft 13 via connecting rods 19.

Combustion chambers 20 are formed in the cylinder head 15 so as to face the top faces of the pistons 18, and are connected to an intake manifold 22 via intake ports 21 and to an engine compartment exhaust passage 24 via exhaust ports 23, the intake ports 21 opening on a left-hand face of the cylinder head 15, that is, on the left side of the vessel when facing the direction of travel, and the exhaust ports 23 opening on a right-hand face of the cylinder head 15. Intake valves 25 for opening and closing the downstream ends of the intake ports 21 and exhaust valves 26 for opening and closing the upstream ends of the exhaust ports 23 are made to open and close by a DOHC type valve operating mechanism 27 housed within the head cover 16. The upstream side of the intake manifold 22 is connected to a throttle valve 29 disposed in front of the crankcase 14 and fixed to a front face thereof, and intake air is supplied to the intake manifold 22 via a silencer 28. An injector base 57 is held between the cylinder head 15 and the intake manifold 22, and injectors 58 for injecting fuel into the intake ports 21 are provided in the injector base 57.

Joined to upper faces of the cylinder block 11, the lower block 12, the crankcase 14, and the cylinder head 15 of the engine E is a chain cover 31 (see FIG. 15) housing a timing chain 30 (see FIG. 14) for transmitting a driving force of the crankshaft 13 to the valve-operating mechanism 27. Joined to the lower faces of the cylinder block 11, the lower block 12, and the crankcase 14 is an oil pump body 34. Joined to the lower face of the oil pump body 34 are, in sequence, a mount case 35, an oil case 36, an extension case 37, and a gear case 38.

The oil pump body 34 has an oil pump 33 housed between the lower face thereof and the upper face of the mount case 35 and has, on the opposite side, a flywheel 32 disposed between itself and the lower face of the cylinder block 11, etc. The oil pump body 34 defines a flywheel chamber and an oil pump chamber. The oil case 36, the mount case 35, and the surroundings of a part of the lower side of the engine E are covered with a synthetic resin under cover 39, and an upper part of the engine E is covered with a synthetic resin engine cover 40, which is joined to the upper face of the under cover 39.

A drive shaft 41 is connected to the lower end of the crankshaft 13, runs through the pump body 34, the mount case 35, and the oil case 36, extends downward within the extension case 37, and is connected via a forward/reverse travel switching mechanism 45 to the front end of a propeller shaft 44 having a propeller 43 provided at its rear end and being supported by the gear case 38 in the fore-and-aft direction, the forward/reverse travel switching mechanism 45 being operated by a shift rod 52. A cooling water pump 46 is provided on the drive shaft 41 and is connected to a lower water supply passage 48 extending upward from a strainer 47 provided in the gear case 38. An upper water supply pipe 49 extends upward from the cooling water pump 46 and is connected to a cooling water passage 36b (see FIG. 6) provided in the oil case 36.

Figure 6:
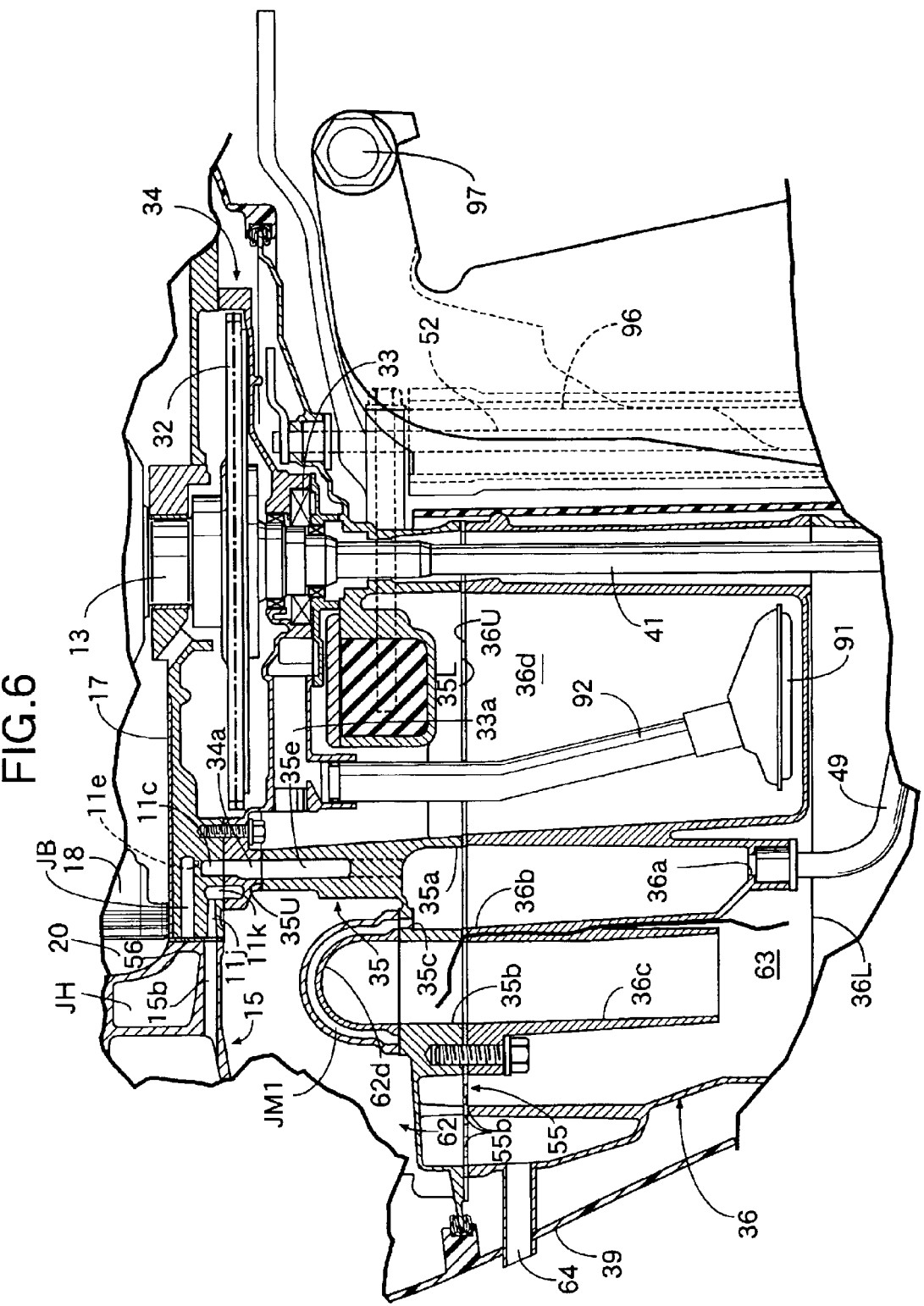

As shown in FIG. 6, a cooling water supply hole 36a is formed in a lower face 36L of the oil case 36 and is connected to the upper end of the upper water supply pipe 49. The cooling water passage 36b, which communicates with the cooling water supply hole 36a, is formed in an upper face 36U of the oil case 36 so as to surround part of an exhaust pipe section 36c formed integrally with the oil case 36. A cooling water passage 35a is formed so as to surround part of an exhaust passage 35b running through the mount case 35, the cooling water passage 35a having the same shape as that of the cooling water passage 36b in the upper face 36U of the oil case 36, which is joined to a lower face 35L of the mount case 35.

Figure 7:
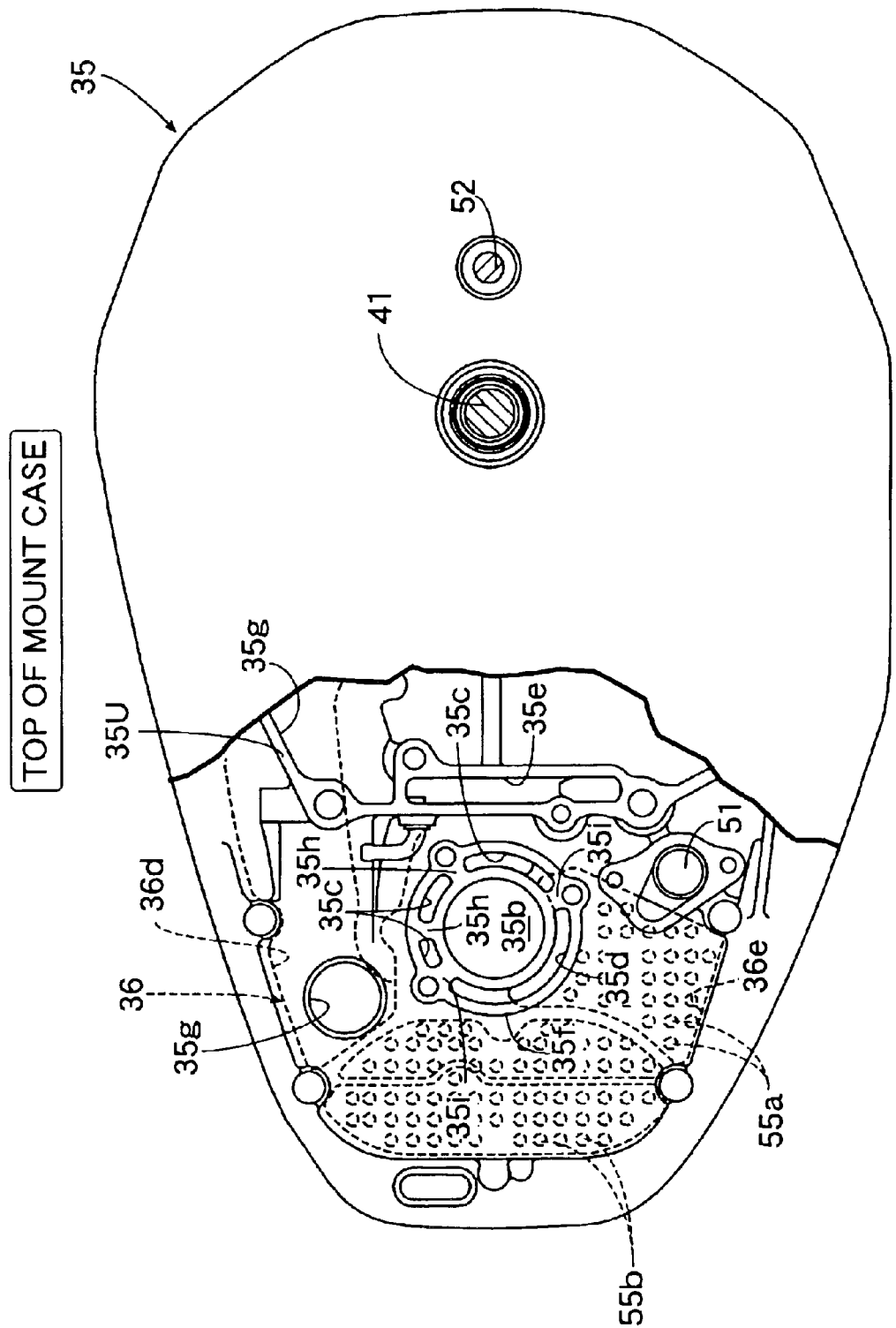

FIG. 7 is a view of the mount case 35 from above. The oil case 36 is joined to the lower face of the mount case 35. The outer periphery of the exhaust passage 35b is surrounded by cooling water supply passages 35c and a cooling water drain passage 35d. In detail, the cooling water passage 35a is formed so as to open downward on the lower face 35L of the mount case 35, and the cooling water supply passages 35c (see FIG. 6), which communicate with the cooling water passage 35a, are formed so as to open upward on the upper face 35U of the mount case 35 in an area outside a cylinder block mounting face and run along the outer periphery of the cylindrical exhaust passage 35b. In the embodiment, there are three of the cooling water supply passages 35c, which are arc-shaped and separated from each other by walls 35h that are connected to the outer wall of the exhaust passage 35b. Furthermore, the one cooling water drain passage 35d, which is arc-shaped, is formed around the outer periphery of the cylindrical exhaust passage 35b in a region outside the region where the cooling water supply passages 35c are provided, the cooling water drain passage 35d being defined by walls 35i that form outer walls of the cooling water supply passages 35c.

A cooling water supply passage 35e is formed in the upper face 35U of the mount case 35 in a channel shape having a U-shaped cross-section, the cooling water supply passage 35e opening upward on the upper face 35U and extending in the left and right directions of the outboard motor O so as to bridge the center of the cylinder 17 in plan view (see FIG. 6), the upper face 35U of the mount case 35 being joined to a cylinder block subassembly containing the oil pump body 34, which will be described later. The above-mentioned cooling water passage 35a extends upward and communicates with the cooling water passage 35e. Provided on the upper face 35U of the mount case 35 is a relief valve 51 that opens to release cooling water when the pressure of the cooling water passage 35a reaches a predetermined value or above (see FIGS. 4 and 7).

The cooling water drain passage 35d communicates, via an opening 36e formed over the entire area of the upper face 36U of the oil case 36 (see FIG. 7), with an exhaust chamber 63 formed within the oil case 36, the extension case 37, and the gear case 38. A gasket 55 is clamped between the lower face 35L of the mount case 35 and the upper face 36U of the oil case 36. Punched holes 55a and punched holes 55b are provided in the gasket 55, the cooling water that has dropped from the cooling water drain passage 35d (see FIG. 7) of the mount case 35 passing through the punched holes 55a, and the punched holes 55b defining part of the exhaust chamber 63 and exhibiting a silencing effect (see FIGS. 6 and 7).

The structure of the engine compartment exhaust passage 24 is now explained by reference to FIGS. 4 to 6 and FIGS. 10 to 13.

Exhaust passage means is broadly divided into an engine compartment exhaust passage 24 portion and an exhaust chamber portion separated from the engine compartment. The engine compartment exhaust passage 24 is joined to a right side face of the cylinder head 15 as described below and includes an exhaust manifold 61 and an exhaust guide 62 connected to the exhaust manifold 61 and guiding exhaust fumes outside the engine compartment. The exhaust manifold 61 comprises single pipe sections 61a for introducing exhaust fumes from each of the combustion chambers 20 and a combined section 61b in the downstream region of these single pipe sections 61a.

As is clear from FIG. 6, the exhaust guide 62 is joined to the upper face 35U of the mount case 35, which forms an engine compartment partition, and communicates with the exhaust passage 35b running through the mount case 35. The exhaust passage 35b communicates with the exhaust pipe section 36c formed integrally with the oil case 36 and communicates with the exhaust chamber 63. In the embodiment, the oil case 36 forms an outer wall section of the exhaust chamber 63 and also forms the exhaust pipe section 36c but, as another arrangement, the exhaust pipe section 36c may be formed as a separate passage. The exhaust passage means may be arranged so that parts thereof are integrally connected, but it is also possible to separately form the engine compartment exhaust passage 24 and its external passage, thereby improving the ease of assembly of each section and maintaining the sealing properties of the exhaust chamber 63.

An upper part of the exhaust chamber 63 communicates with the outside of the under cover 39 via an exhaust outlet pipe 64 provided in the oil case 36 so that, when the engine E runs with a low load, the exhaust gas is discharged into the atmosphere via the exhaust outlet pipe 64 without being discharged into water.

The exhaust manifold 61 has four single pipe sections 61a communicating with the four exhaust ports 23, and the combined section 61b where the single pipe sections 61a are integrally combined. The majority of the combined section 61b is in intimate contact with a side face of the cylinder head 15, but the vicinity of a lower end part of the combined section 61b is bent so that its center line is separated from the side face of the cylinder head 15 by only a distance $\alpha$ (see FIG. 10). The exhaust guide 62 is curved into an S-shape, and the outer periphery of the lower end of the exhaust manifold 61 is fitted into the inner periphery of a large diameter joining section 62a at the upper end of the exhaust guide 62 via a pair of O rings 53 and 54.

In this way, only the vicinity of the lower end part of the exhaust manifold 61 is bent away from the side face of the cylinder head 15, the other, remaining upper half of the intake manifold 61 is connected so as to follow the side face of the cylinder head 15. Therefore, it is possible to prevent the large diameter joining section 62a from interfering with the cylinder head 15 while minimizing the space for arranging the engine compartment exhaust passage 24. In particular, since the bent section of the exhaust manifold 61 is lower than the lowest combustion chamber 20, it is possible to prevent an imbalanced effect on the flows of exhaust gas from the plurality of combustion chambers 20, which are arranged in the vertical direction, thereby minimizing any reduction in exhaust efficiency.

Furthermore, since the exhaust manifold 61 and the joining section 62a of the exhaust guide 62 have a structure in which they are fitted together via the O rings 53 and 54, not only is the operation of joining the exhaust manifold 61 and the exhaust guide 62 simple, but also dimensional errors in the vertical direction of the engine compartment exhaust passage 24 can be absorbed by the joining section 62a, thereby improving the ease of assembly. Moreover, since an upper end part of a first exhaust guide cooling water jacket JM1 and a lower end part of an exhaust manifold cooling water jacket JM2 are positioned in the vicinity of the O rings 53 and 54, it is possible to prevent the O rings 53 and 54 from deteriorating due to heat.

The exhaust guide 62 has a flange 62b formed at the lower end thereof. Three bolt holes 62c, three cooling water inlets 62e, and one cooling water outlet 62f are formed in the flange 62b, the three cooling water inlets 62e being arc-shaped and surrounding the exhaust passage 62d. When the flange 62b of the exhaust guide 62 is bolted to a mounting seat 35f (see FIG. 7) on the upper face 35U of the mount case 35, the cooling water inlets 62e of the exhaust guide 62 communicate with the cooling water supply passages 35c of the mount case 35, and the cooling water outlet 62f communicates with the cooling water drain passage 35d of the mount case 35. With regard to the lower face 35L side of the mount case 35 of the mounting seat 35f, among the outer walls forming the cooling water drain passage 35d, the side opposite the exhaust passage 35b remains at a slightly higher position than the gasket face, and cooling water drains onto the gasket 55 through a gap between the lower face of the outer wall and the gasket face.

Formed in the exhaust guide 62 are the first exhaust guide cooling water jacket JM1 and a second exhaust guide cooling water jacket JM3, which surround the exhaust passage 62d. The first exhaust guide cooling water jacket JM1 covers half of the periphery on the upper face side, and the second exhaust guide cooling water jacket JM3 covers half of the periphery on the lower face side. A part of the first exhaust guide cooling water jacket JM1 in the circumferential direction protrudes radially at an upper end part of the exhaust guide 62 to form a protruding portion 62g.

The exhaust manifold cooling water jacket JM2 is formed so as to surround the exhaust manifold 61, and a through hole 61c extending in the circumferential direction is formed at the lower end of the exhaust manifold cooling water jacket JM2. Therefore, when the lower end of the exhaust manifold 61 is fitted into the inner periphery of the joining section 62a of the exhaust guide 62, the exhaust manifold cooling water jacket JM2 of the exhaust manifold 61 and the first exhaust guide cooling water jacket JM1 of the exhaust guide 62 communicate with each other via the through hole 61c of the exhaust manifold 61 and the protruding portion 62g of the exhaust guide 62 (see FIG. 13).

Figure 4:
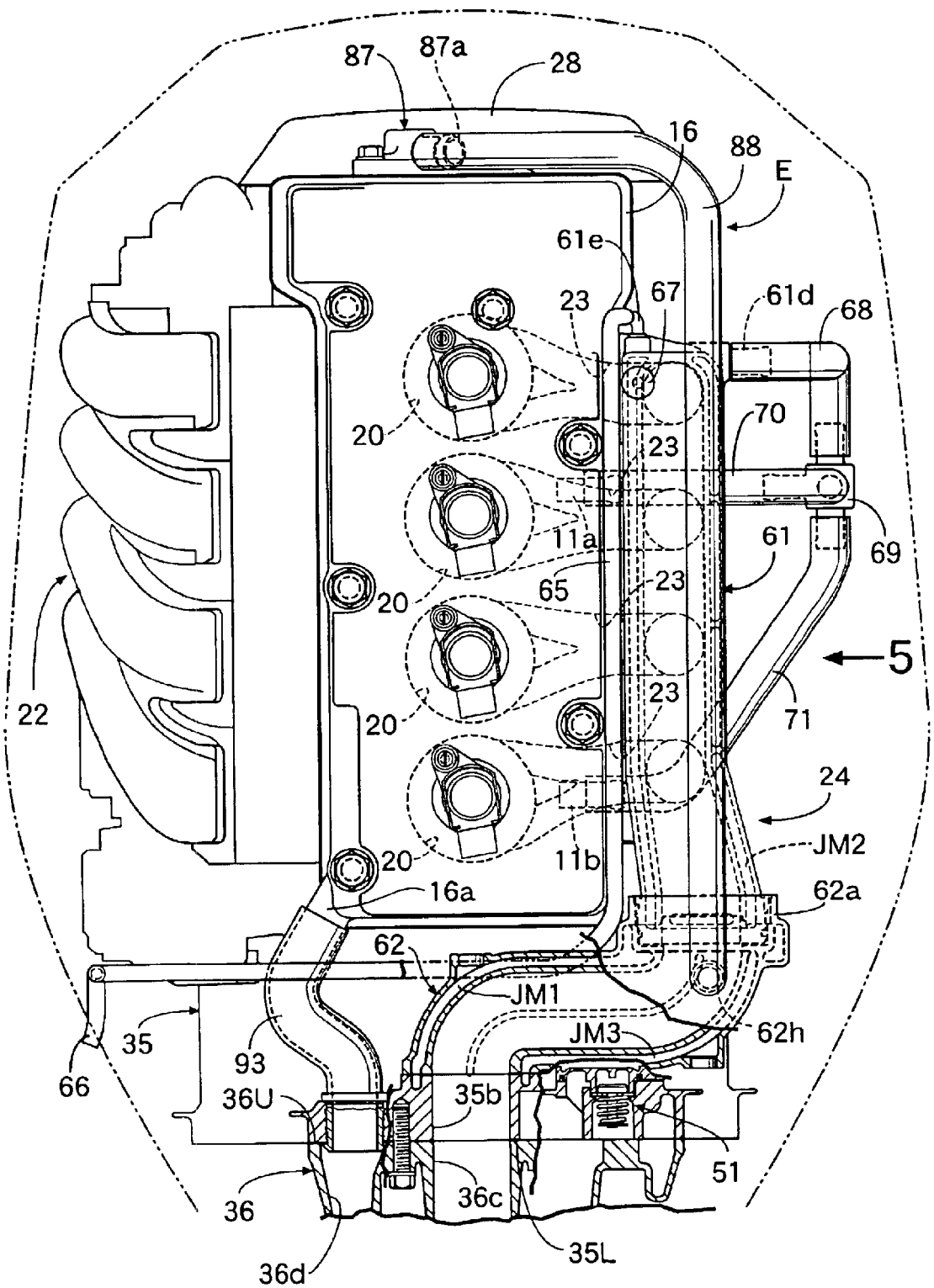
Figure 5:
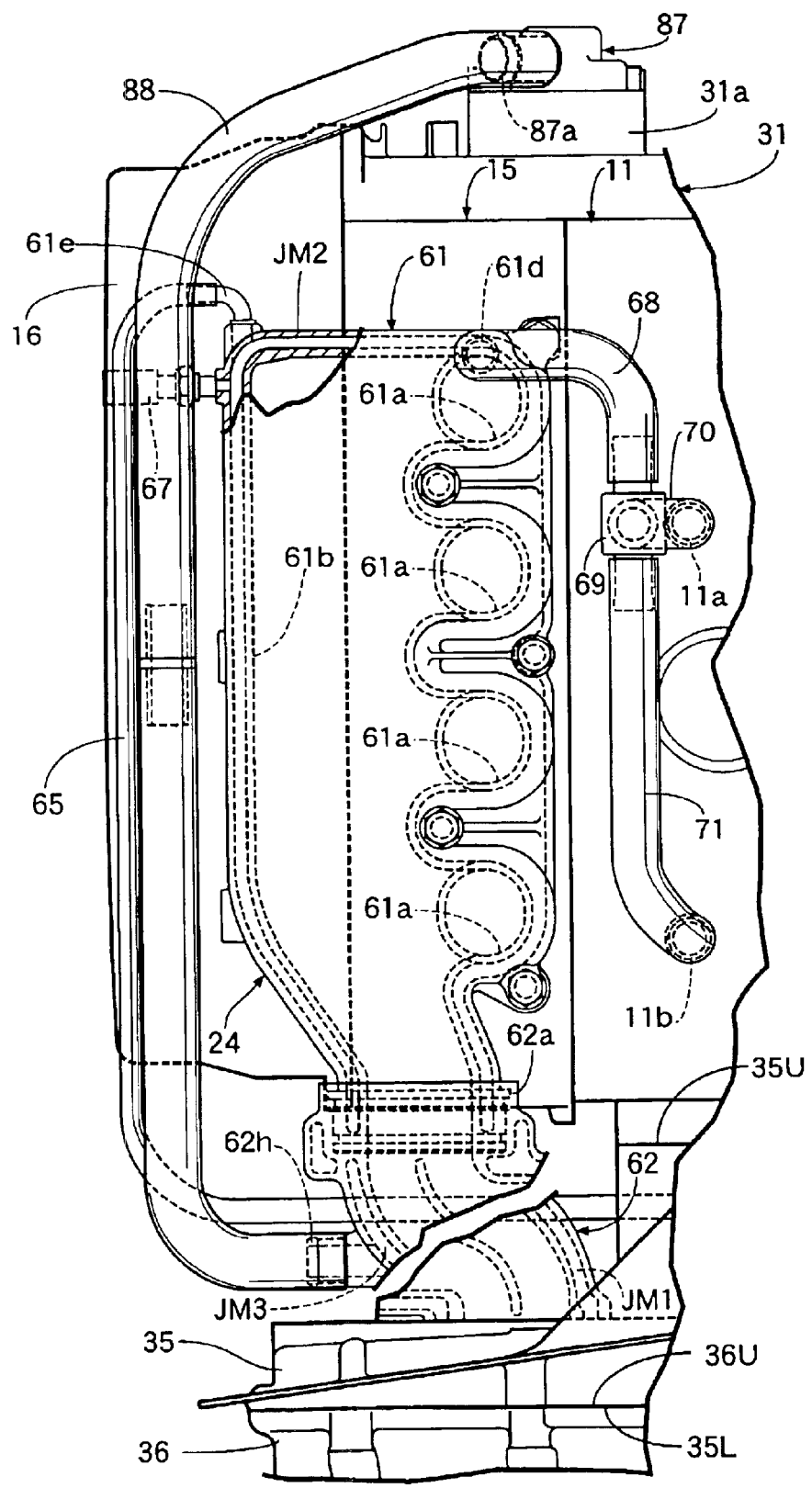

As is clear from FIGS. 4 and 5, provided in an upper part of the exhaust manifold cooling water jacket JM2 of the exhaust manifold 61 are a coupling 61d for distributing part of the cooling water to the cylinder block 11, a coupling 61e for supplying part of the cooling water to a water check outlet 66 (see FIG. 2) via a hose 65, and a cooling water temperature sensor 67 for detecting the temperature of the cooling water.

The structure of the cooling system of the cylinder block 11 is now explained by reference to FIGS. 3 to 5.

The cooling water whose temperature has increased after cooling the engine compartment exhaust passage 24 while passing through the first exhaust guide cooling water jacket JM1 of the exhaust guide 62 and the exhaust manifold cooling water jacket JM2 of the exhaust manifold 61 is supplied via a water supply pipe 68 to a T-shaped three-way joint, or a branching member 69, from the coupling 61d provided at the upper end of the exhaust manifold cooling water jacket JM2 of the exhaust manifold 61, and branches into two water supply pipes 70 and 71. A cylinder block cooling water jacket JB surrounding the four cylinders 17 is formed in the cylinder block 11. Couplings 11a and 11b are provided at positions close to the upper end of the cylinder block cooling water jacket JB (at the side of the second from highest combustion chamber 20) and close to the lower end of the cylinder block cooling water jacket JB (at the side of the lowest combustion chamber 20). The water supply pipe 70 on the upper side is connected to the coupling 11a on the upper side, and the water supply pipe 71 on the lower side is connected to the coupling 11b on the lower side. In this way, since the exhaust manifold cooling water jacket JM2 and the cylinder block cooling water jacket JB are connected via the water supply piles 68, 70, and 71, machining is easier than a case where cooling water supply passages are formed within the cylinder block 11 and the cylinder head 15.

Figure 8:
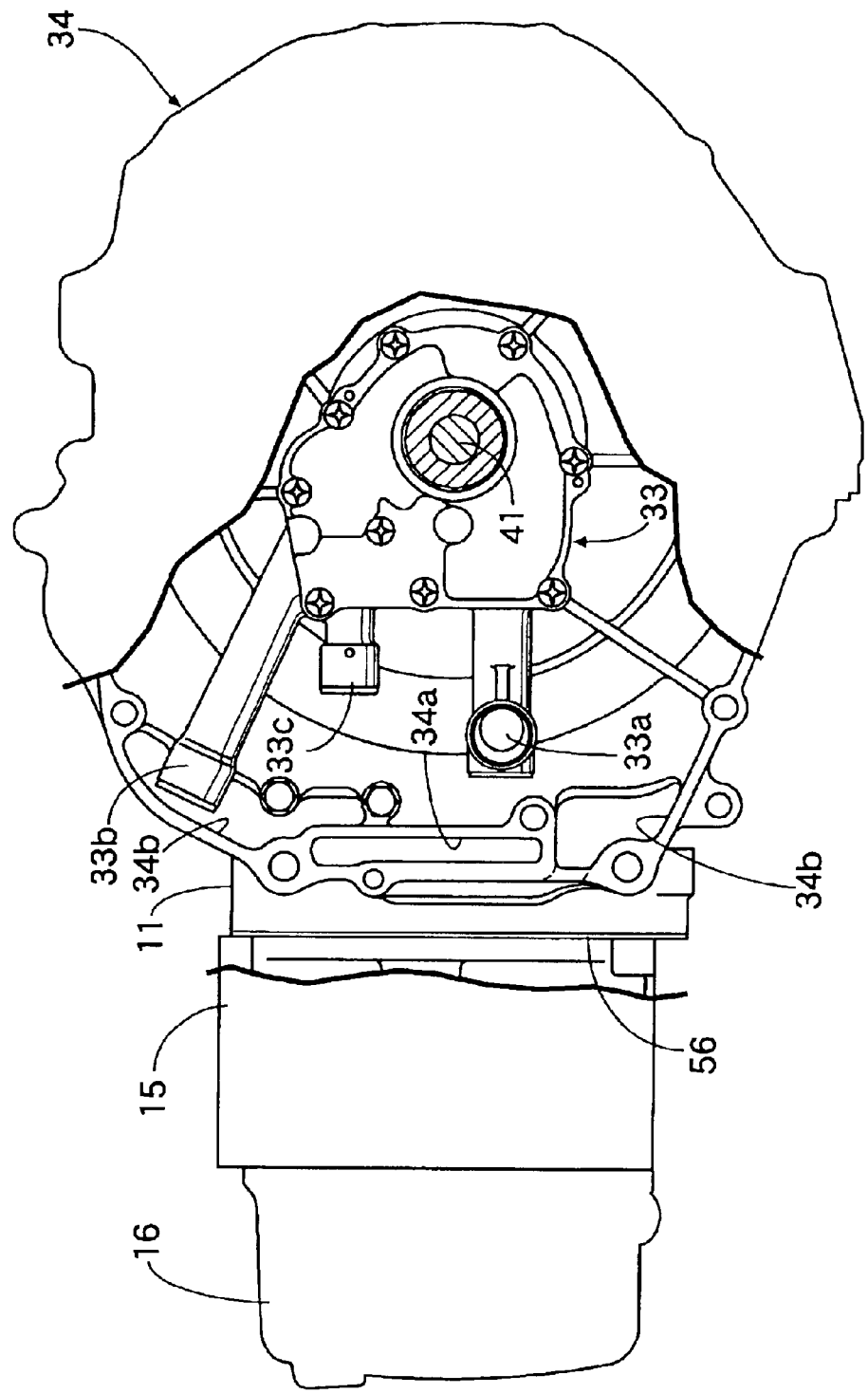
Figure 9:
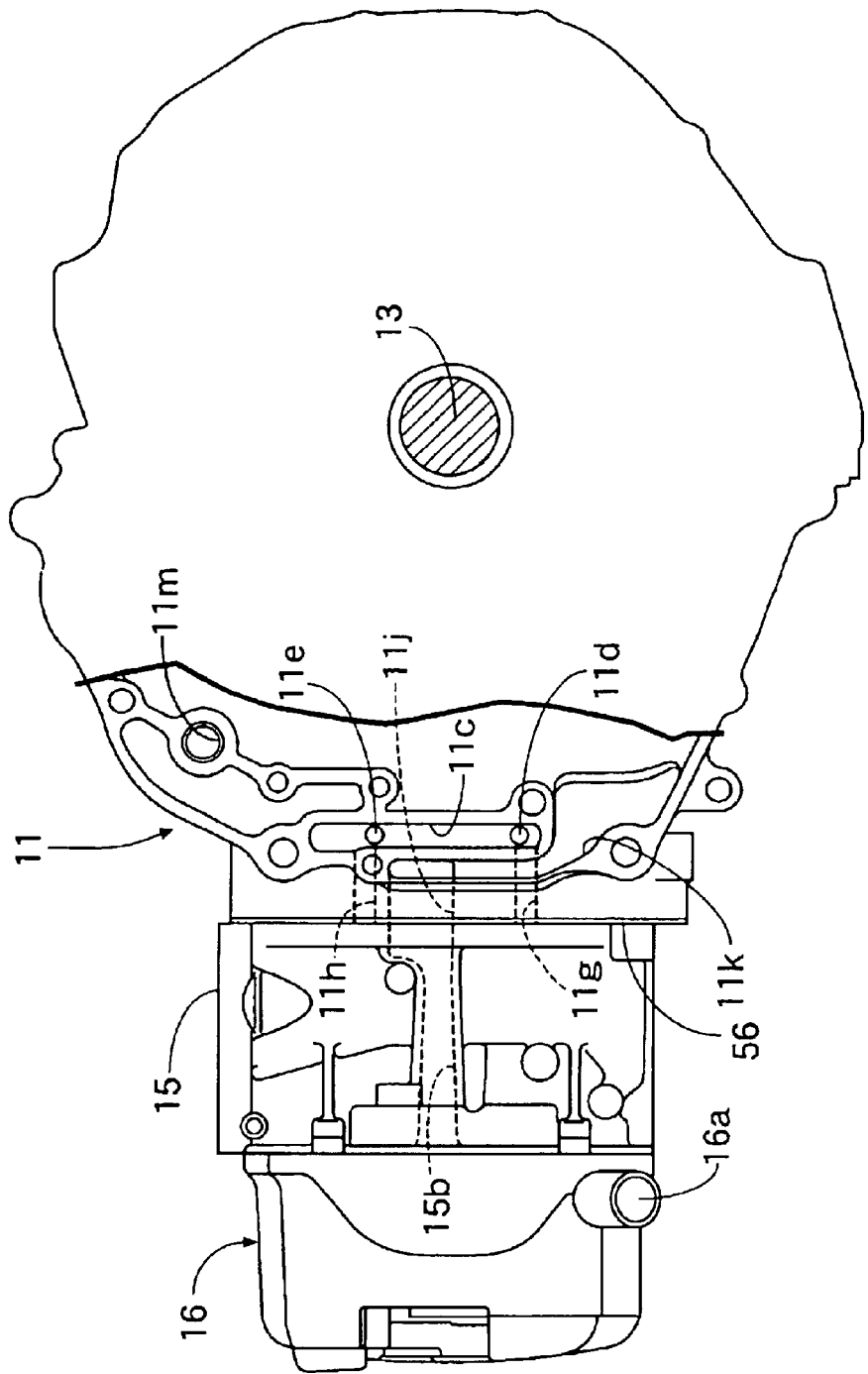
Figure 10:
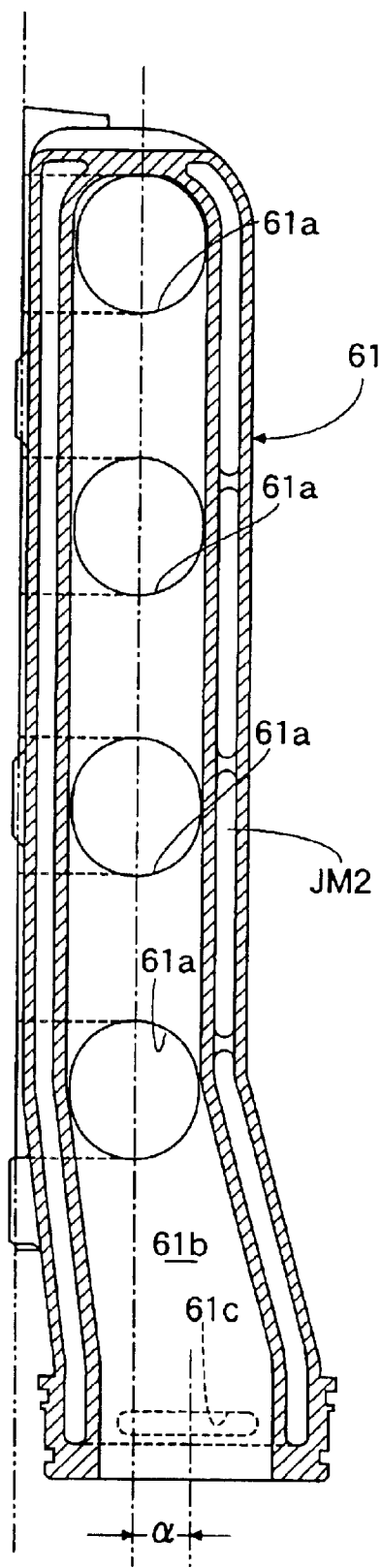
Figure 11:
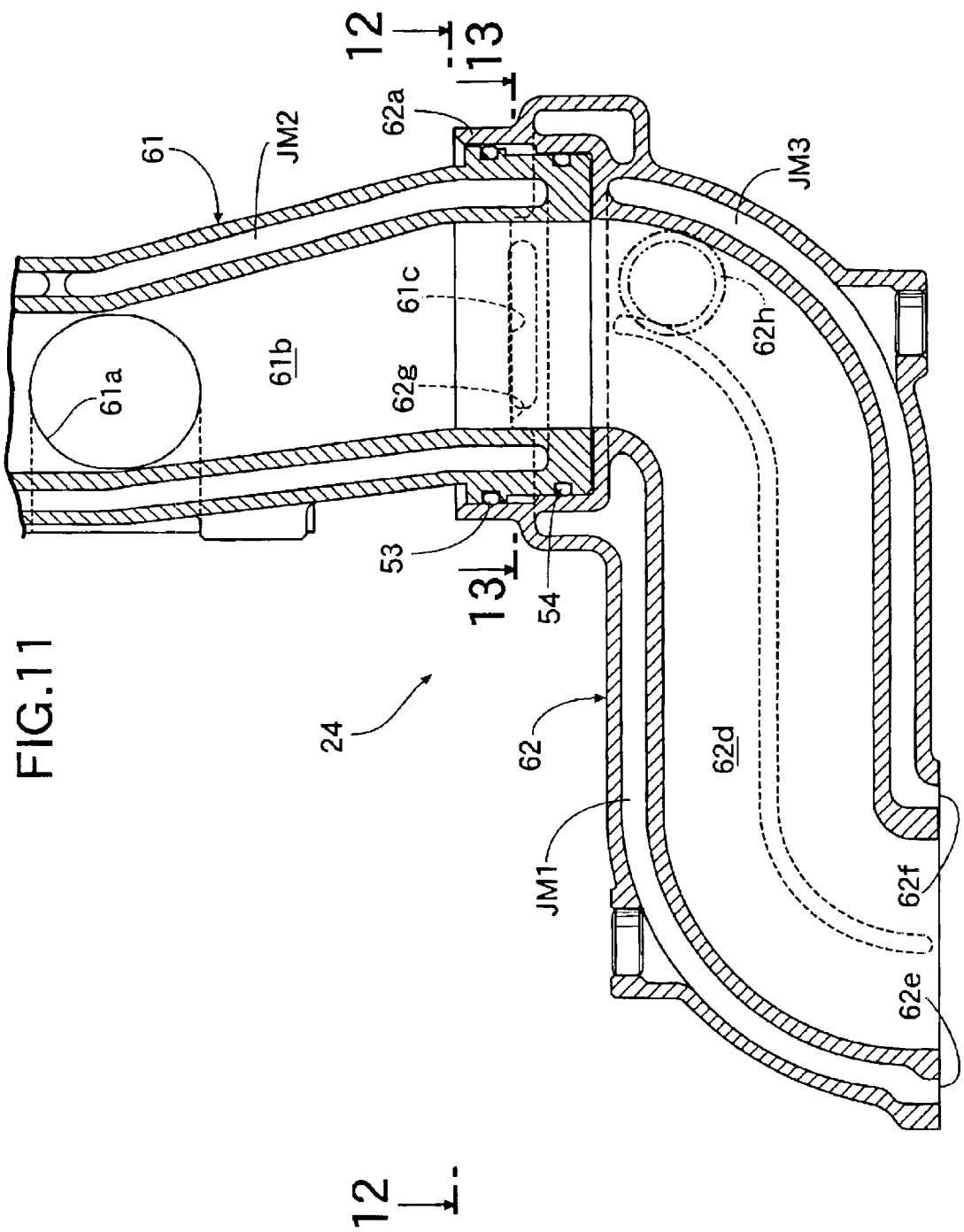
Figure 12:
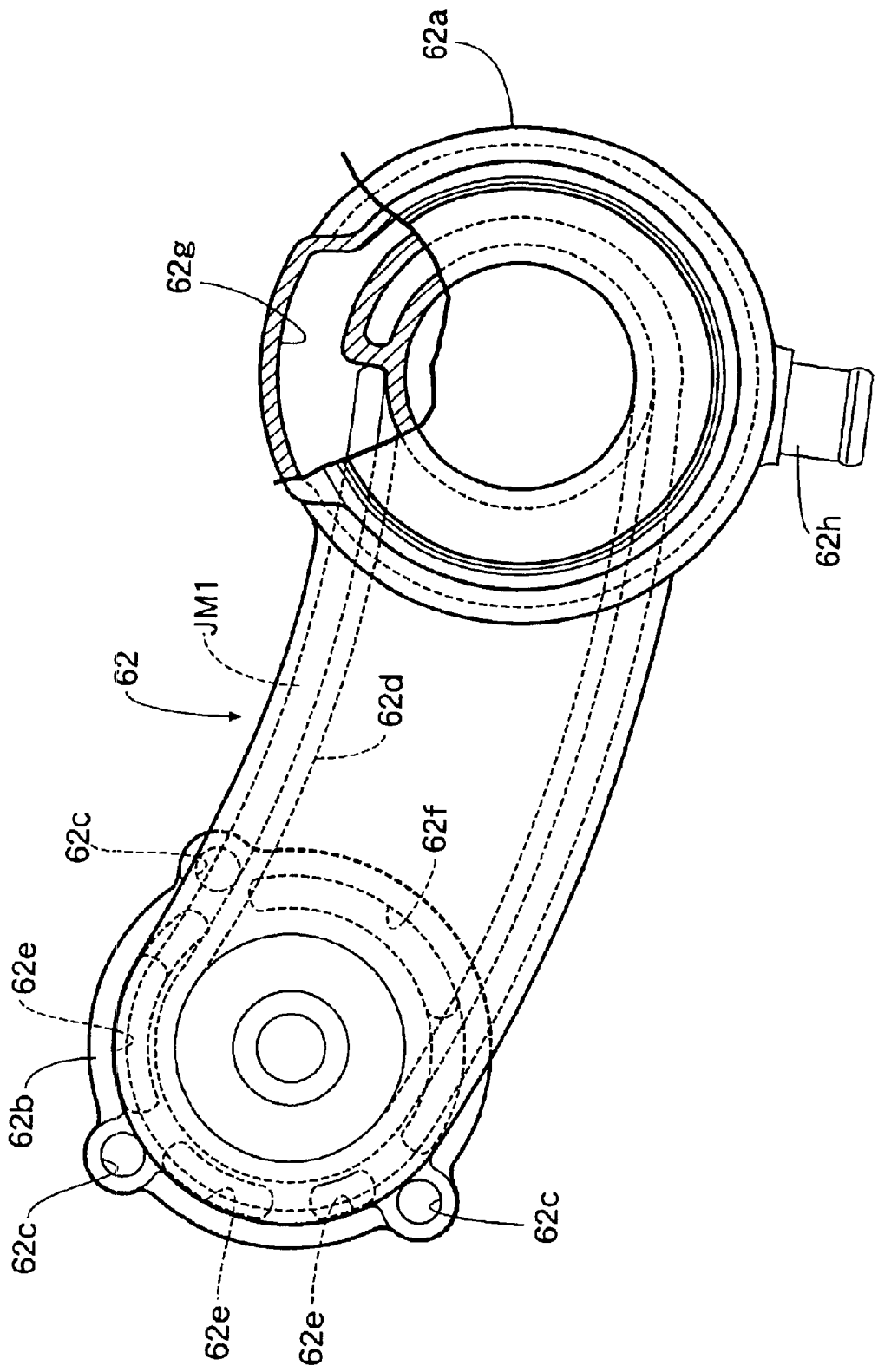
Figure 13:
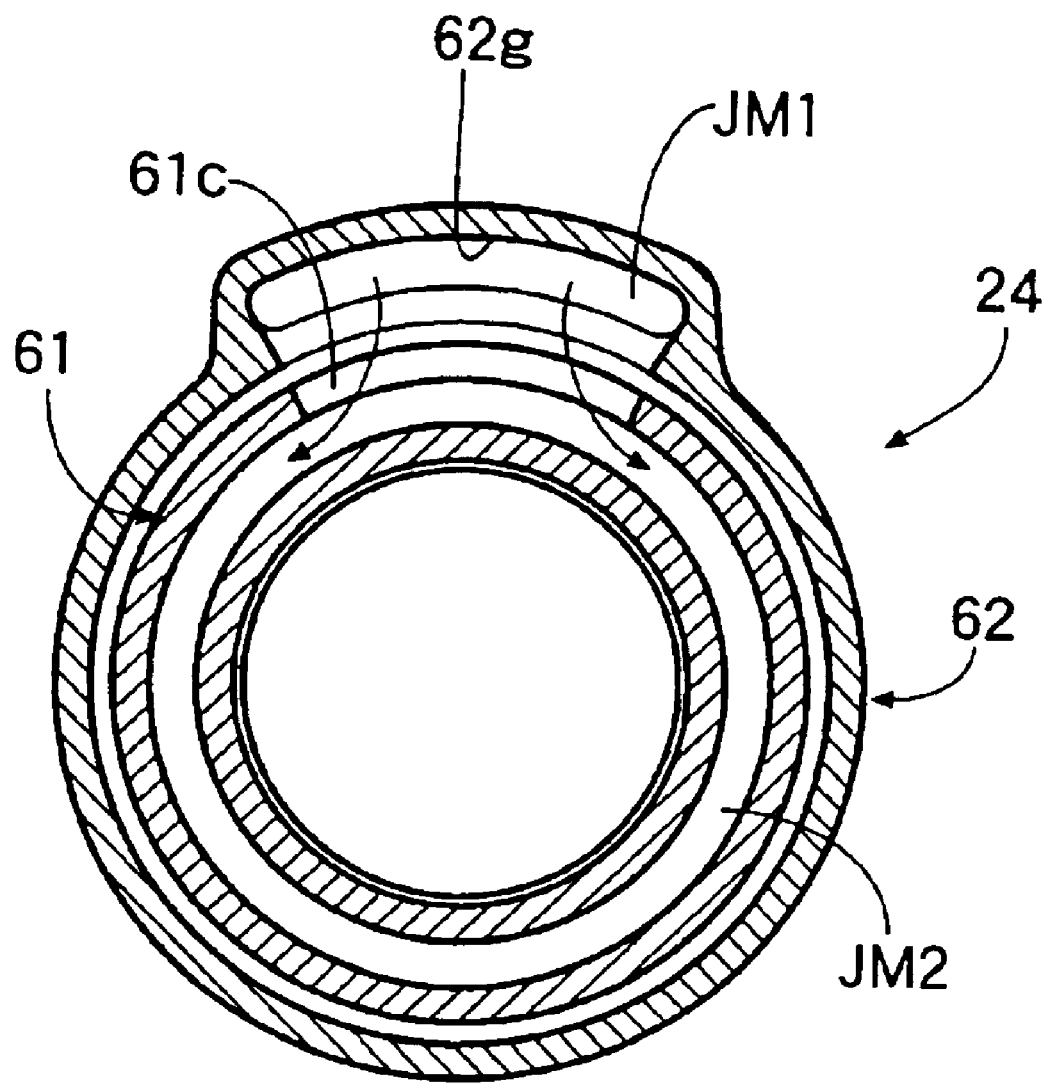

A slit-shaped cooling water passage 34a (see FIG. 8) formed so as to run though the pump body 34 communicates with the slit-shaped cooling water passage 35e (see FIG. 7) formed so as to run through the mount case 35 and also communicates with a cooling water passage 11c (see FIG. 9) formed in the lower face of the cylinder block 11, the cooling water passage 11c having the same mating surface shape as that of the cooling water passage 35e and extending in the left and right directions so as to bridge the middle in the left and right width direction of the cylinders 17. As shown in FIGS. 3 and 9, the cooling water passage 11c of the cylinder block 11 has a channel shape opening downward and communicates with the lower end of the cylinder block cooling water jacket JB of the cylinder block 11 via two through holes 11d and 11e running through the upper wall of the channel.

As is clear from FIG. 3, after flowing through the cylinder block cooling water jacket JB of the cylinder block 11 the cooling water is supplied to a thermostat, which will be described later, through a cooling water passage 11f formed in an upper left part of the cylinder block 11.

The structure of the cooling system of the cylinder head 15 is now explained by reference to FIGS. 3, 6, and 9.

Two short cooling water passages 11g and 11h branch toward the cylinder head 15 from the side wall of the slit-shaped cooling water passage 11c formed in the lower face of the cylinder block 11. These cooling water passages 11g and 11h communicate with a cylinder head cooling water jacket JH of the cylinder head 15 through a gasket 56 provided between the cylinder block 11 and the cylinder head 15. The cylinder block cooling water jacket JB surrounding the cylinders 17 of the cylinder block 11 is isolated from the cylinder head cooling water jacket JH of the cylinder head 15 via the gasket 56 disposed between the mating surfaces of the cylinder block 11 and the cylinder head 15 (see FIGS. 2 and 6).

The thermostat provided in the cooling water circulation system is now explained.

Figure 14:
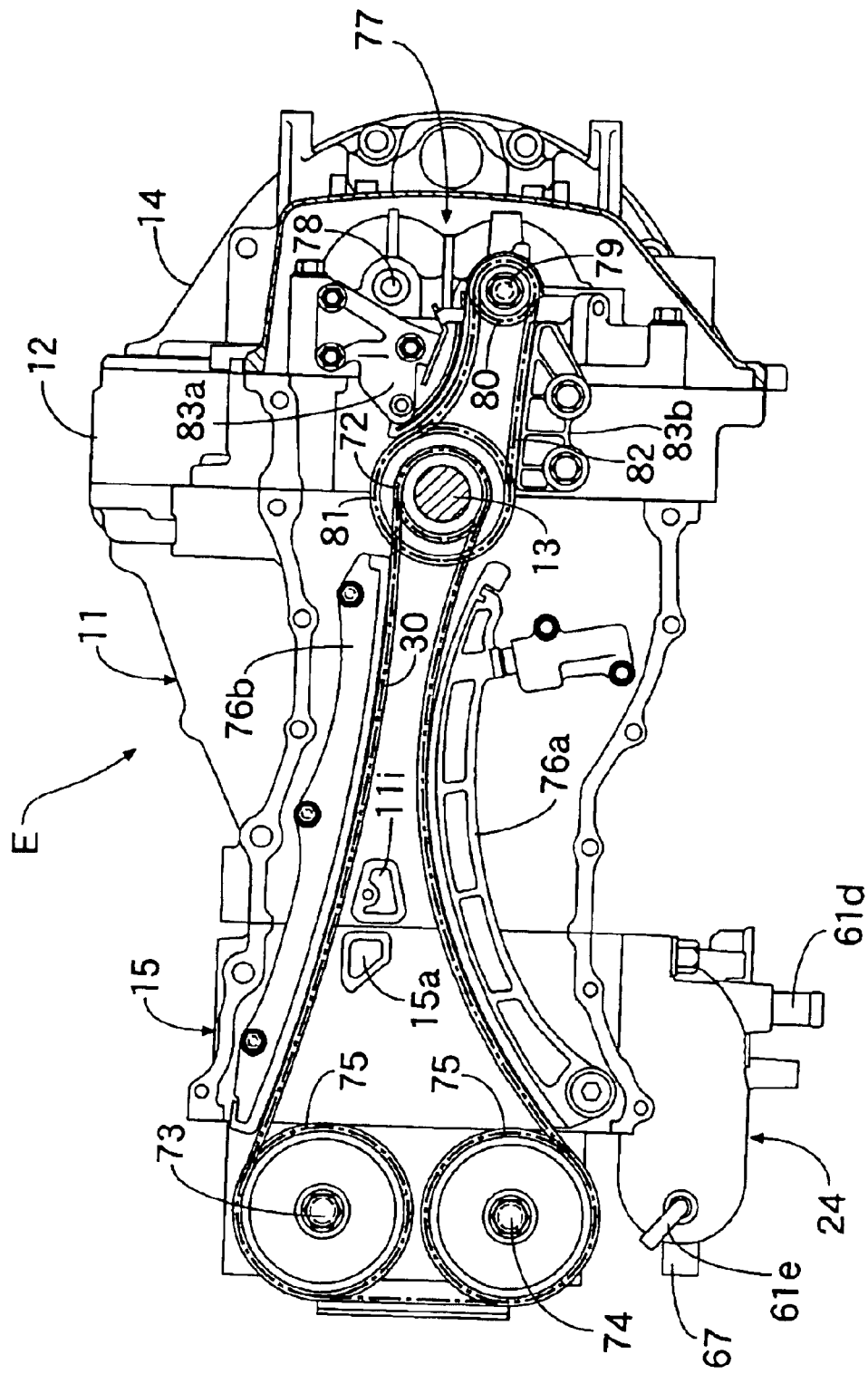
Figure 15:
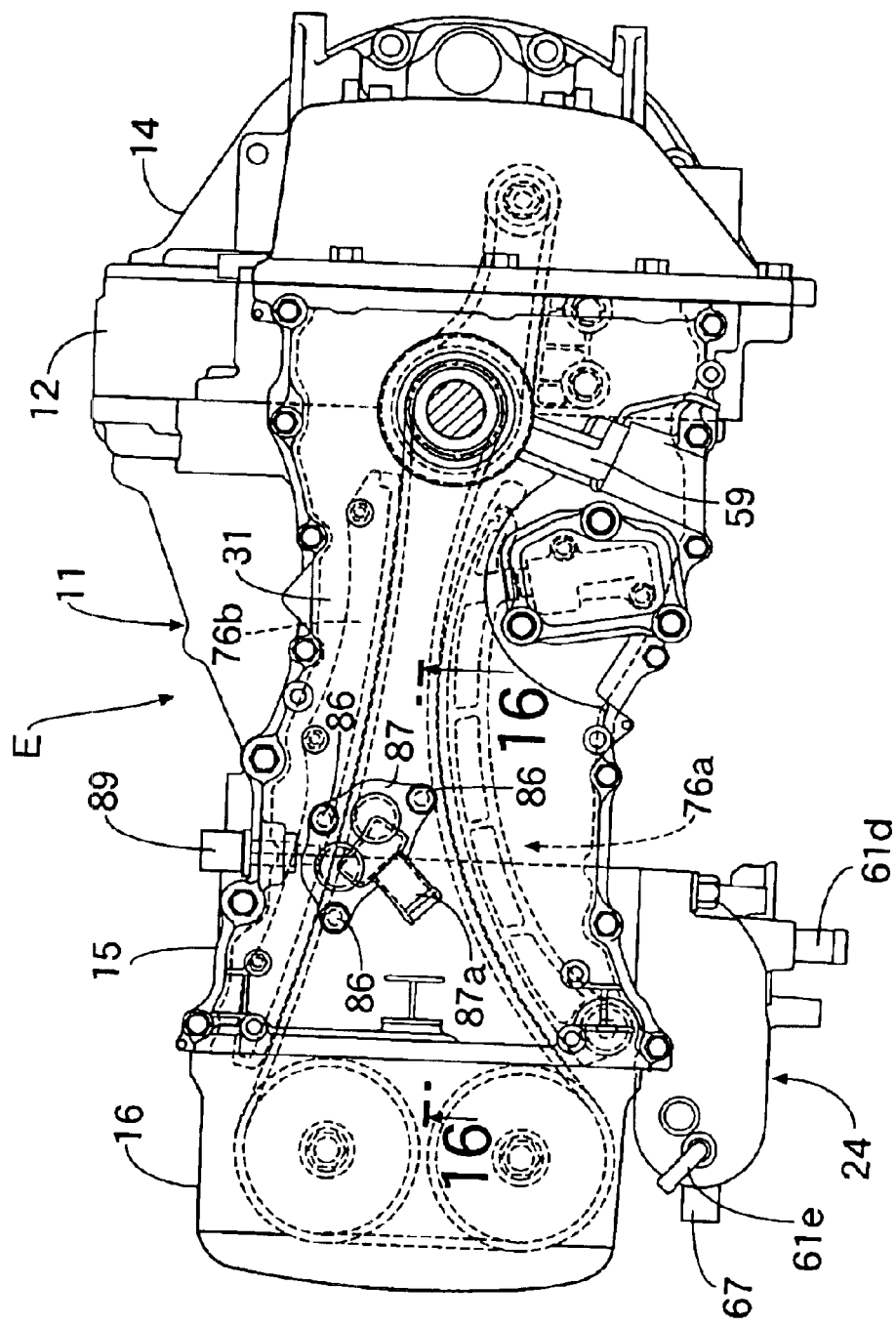
Figure 16:
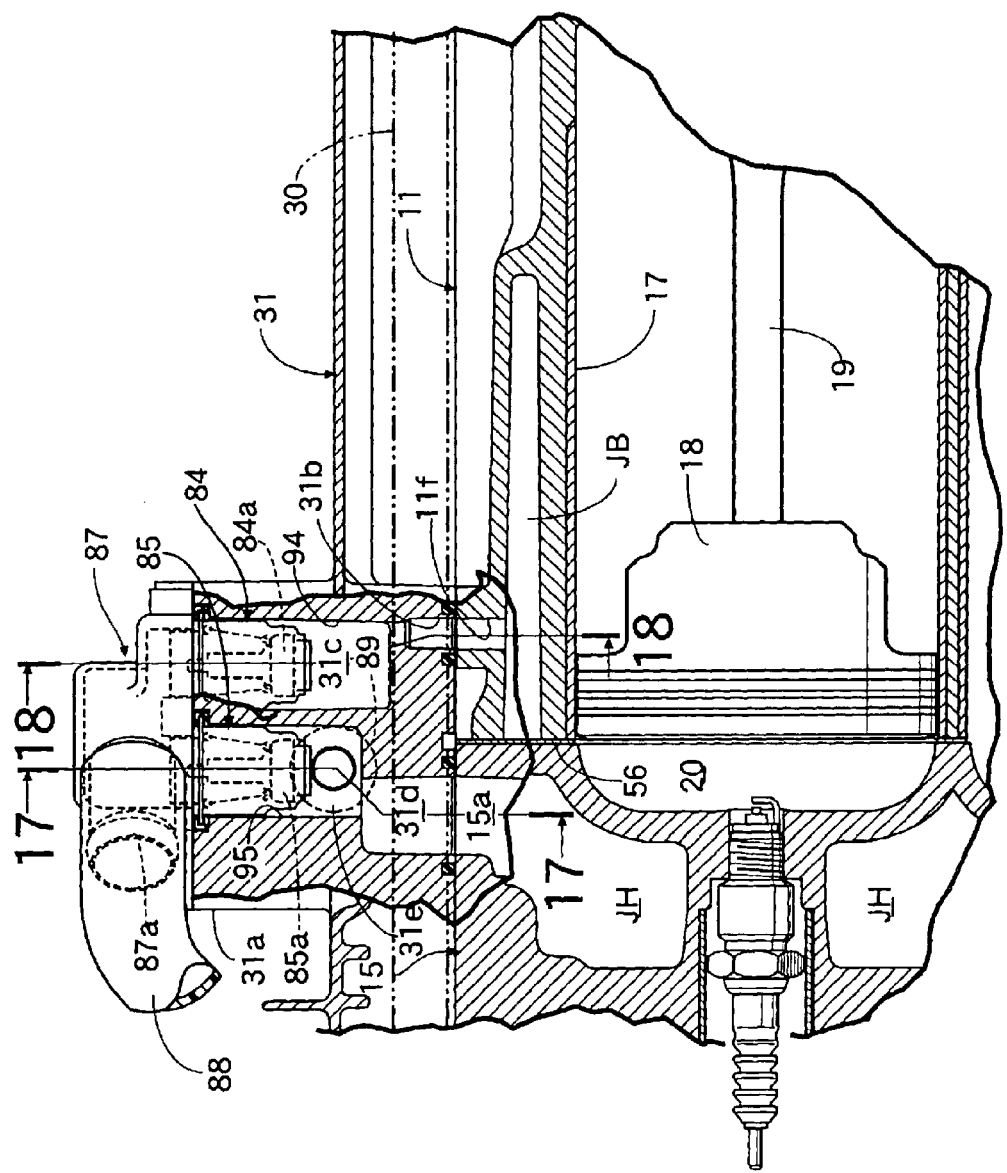
Figure 17:
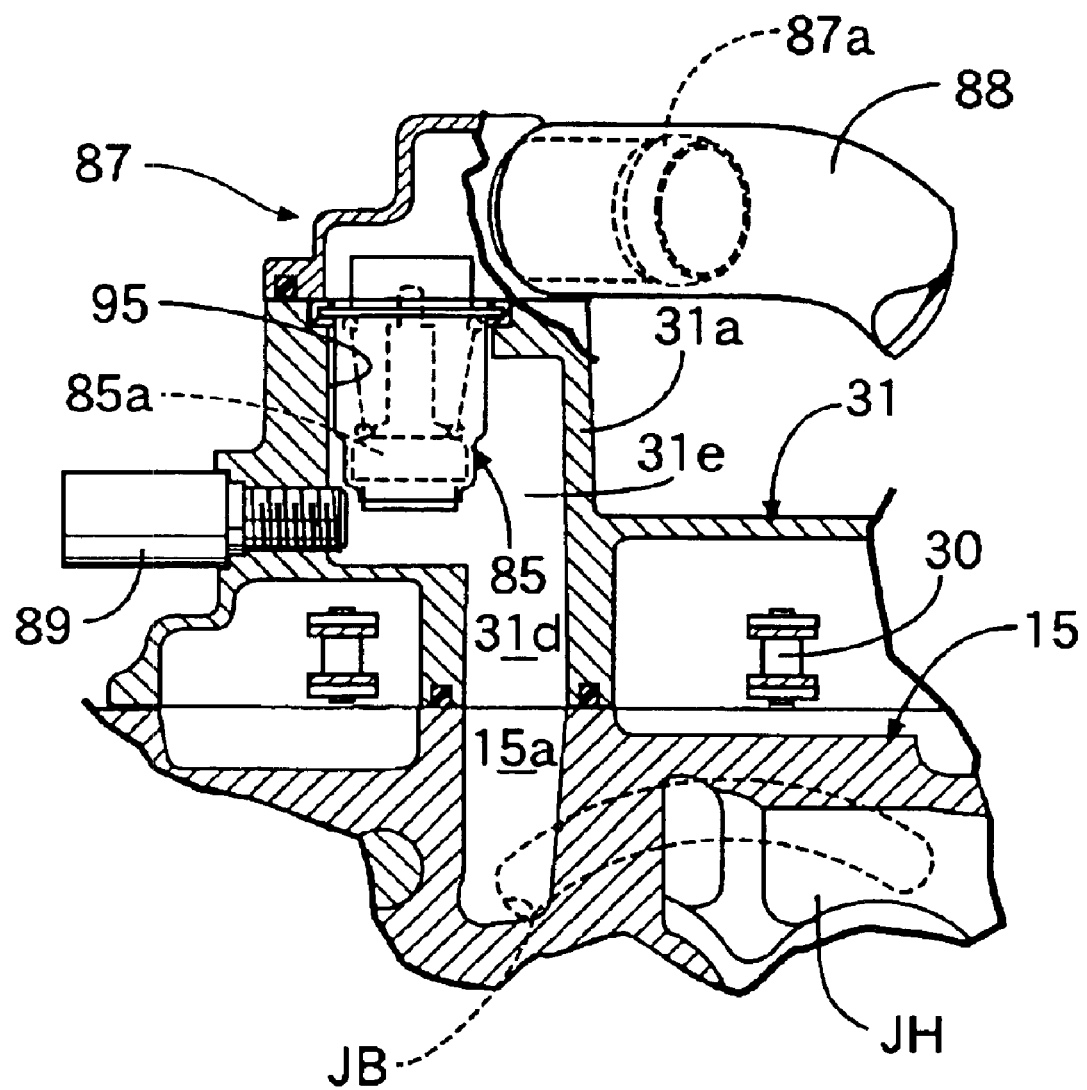
Figure 18:
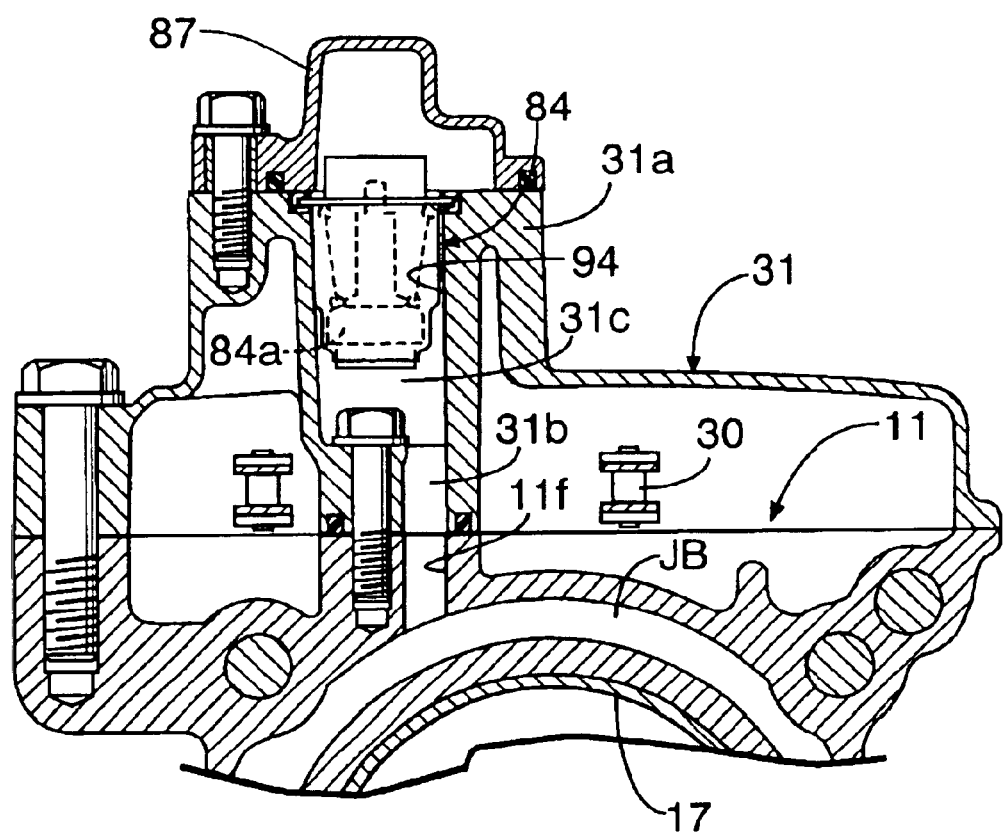

As shown in FIG. 14, the timing chain 30 is wound around a cam drive sprocket 72 provided at the upper end of the crankshaft 13 and cam driven sprockets 75 provided on a pair of camshafts 73 and 74 positioned to the rear of the cylinder head 15. A hydraulic chain tensioner 76a abuts against the loose side of the timing chain 30, and a chain guide 76b abuts against the opposite side of the timing chain 30. The number of teeth of the cam drive sprocket 72 is half the number of teeth of the cam driven sprockets 75, and the camshafts 73 and 74 therefore rotate at a rotational speed that is half the rotational speed of the crankshaft 13.

A balancer 77 is housed within the crankcase 14. An endless chain 82 is wound around a balancer drive sprocket 81 provided on the crankshaft 13 and a balancer driven sprocket 80 provided on one of two balancer shafts 78 and 79 of the balancer 77. A chain tensioner 83a abuts against the loose side of the endless chain 82, and a chain guide 83b abuts against the opposite side of the endless chain 82. The number of teeth of the balancer drive sprocket 81 is twice the number of teeth of the balancer driven sprocket 80, and the balancer shafts 78 and 79 therefore rotate at a rotational speed that is twice the rotational speed of the crankshaft 13.

As is clear from FIGS. 15 to 18, upper faces of the cylinder block 11 and the cylinder head 15 are covered with the chain cover 31, and the timing chain 30 is housed within the chain cover 31. In order to lubricate the timing chain 30, an oil atmosphere is maintained inside the chain cover 31. A thermostat mounting seat 31*a* is formed on the chain cover 31 so as to bridge the mating surfaces of the cylinder block 11 and the cylinder head 15. The lower face of the thermostat mounting seat 31*a* abuts against the upper faces of the cylinder block 11 and the cylinder head 15, and the upper face is stepped higher than the upper face of a main body portion of the chain cover 31. An engine rotational speed sensor 59 for detecting the rotational speed of the crankshaft 13 is provided on the chain cover 31 (see FIG. 15).

Formed in the thermostat mounting seat 31*a* of the chain cover 31 are cooling water passages 31*b* and 31*c* and cooling water passages 31*d* and 31*e*, the cooling water passages 31*b* and 31*c* communicating with a cooling water passage 11*f* branching upward from the cylinder block cooling water jacket JB of the cylinder block 11, and the cooling water passages 31*d* and 31*e* communicating with a cooling water passage 15*a* branching from the cylinder head cooling water jacket JH of the cylinder head 15. A first thermostat 84 on the cylinder block 11 side is mounted in the cooling water passage 31*c*, and a second thermostat 85 on the cylinder head 15 side is mounted in the cooling water passage 31*e*. The first thermostat 84 having a valve body 84*a*, and the second thermostat 85 having a valve body 85*a*, are housed within thermostat chambers 94 and 95 respectively and covered with a common thermostat cover 87 fixed to the upper face of the thermostat mounting seat 31*a* by three bolts 86. A coupling 87*a* provided on the thermostat cover 87 is connected to the second exhaust guide cooling water jacket JM3 via a drain pipe 88 and a coupling 62*h* provided on the exhaust guide 62.

A cooling water temperature sensor 89 is provided in the cooling water passage 31*e* of the chain cover 31, the cooling water passage 31*e* facing the second thermostat 85 on the cylinder head cooling water jacket JH side.

As explained above, combustion gas within the combustion chambers 20 shut off by the intake valves 25 and the exhaust valves 26 is a first heat source, exhaust gas flowing to the outside through the engine compartment exhaust passage 24 is a second heat source, the cylinder head cooling water jacket JH and the cylinder block cooling water jacket JB correspond to first cooling means for cooling the first heat source, and the first exhaust guide cooling water jacket JM1 and the exhaust manifold cooling water jacket JM2 correspond to second cooling means, which cools the second heat source after exchanging heat with the first cooling means.

The structure of the lubrication system of the engine E is now explained by reference to FIGS. 3, 4, and 6 to 9.

The oil case 36 is integrally provided with an oil pan 36*d*, and a suction pipe 92 having an oil strainer 91 is housed within the oil pan 36*d*. Provided in the oil pump 33 are an oil intake passage 33*a*, an oil discharge passage 33*b*, and an oil relief passage 33*c*. The oil intake passage 33*a* is connected to the suction pipe 92. The oil discharge passage 33*b* is connected, via an oil supply hole 11*m* (see FIG. 9) formed in the lower face of the cylinder block 11, to each section of the engine E that is to be lubricated. The oil relief passage 33*c* discharges return oil from the oil pump 33 into the oil pan 36*d*.

Part of the return oil from the valve operating mechanism 27 provided within the cylinder head 15 and the head cover 16 is returned to the oil pan 36*d* via a coupling 16*a* provided on the head cover 16, an oil hose 93, and an oil return passage 35*g* (see FIG. 7) running through the mount case 35.

Another part of the return oil from the valve operating mechanism 27 is returned to the oil pan 36*d* via an oil return passage 15*b* (see FIG. 9) formed in the cylinder head 15, an oil return passage 11*j* (see FIG. 9) opening on gasket faces of the cylinder block 11 and the cylinder head 15, an oil return passage 11*k* (see FIG. 9) running through the cylinder block 11, an oil return passage 34*b* (see FIG. 8) running through the pump body 34, and the oil return passage 35*g* (see FIG. 7) running through the mount case 35. The oil return passage 11*j* opening on the gasket 56 between the cylinder block 11 and the cylinder head 15 is disposed between the two cooling water passages 11*g* and 11*h* opening on the gasket 56 (see FIG. 3).

Return oil from the crankcase 14 is returned to the oil pan 36*d* via an oil return passage (not illustrated) running through the pump body 34 and the oil return passage 35*g* (see FIG. 7) running through the mount case 35.

Figure 19:
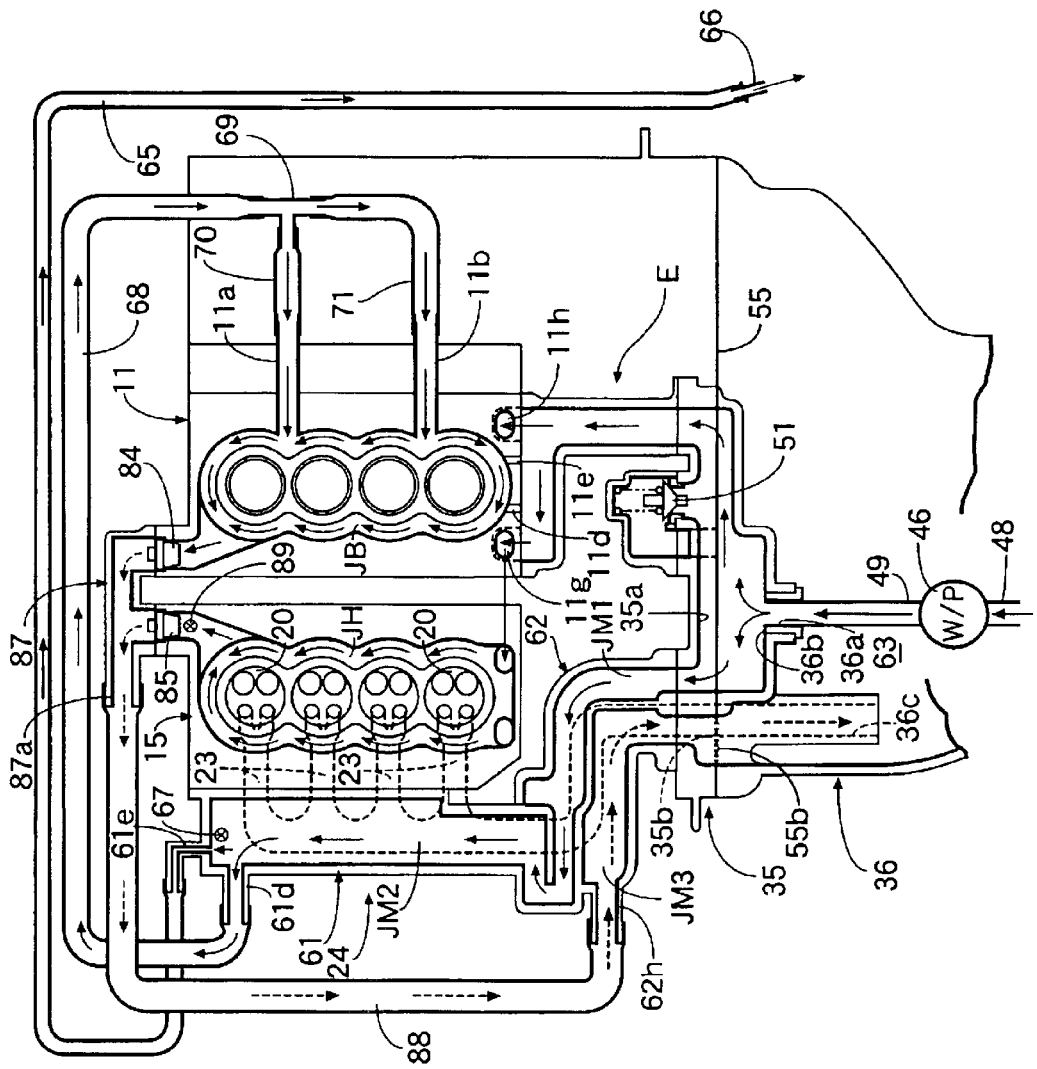

The operation of the embodiment of the present invention having the above-mentioned arrangement is now explained mainly by reference to the cooling water circuit shown in FIG. 19.

When the drive shaft 41 connected to the crankshaft 13 rotates in response to operation of the engine E, the cooling water pump 46 provided on the drive shaft 41 operates to supply cooling water, which is drawn up via the strainer 47, to the cooling water supply hole 36*a* on the lower face of the oil case 36 via the lower water supply passage 48 and the upper water supply pipe 49. The cooling water that has passed through the cooling water supply hole 36*a* flows into both the cooling water passage 36*b* in the upper face 36U of the oil case 36 and the cooling water passage 35*a* in the lower face 35L of the mount case 35. Part of the cooling water branching therefrom is supplied to both the first exhaust guide cooling water jacket JM1 formed in the exhaust guide 62 of the engine compartment exhaust passage 24 and the exhaust manifold cooling water jacket JM2 formed in the exhaust manifold 61. The exhaust gas discharged from the combustion chambers 20 of the cylinder head 15 is discharged into the exhaust chamber 63 via the single pipe sections 61*a* and the combined section 61*b* of the exhaust manifold 61, the exhaust passage 62*d* of the exhaust guide 62, the exhaust passage 35*b* of the mount case 35, and the exhaust pipe section 36*c* of the oil case 36. The engine compartment exhaust passage 24, which is heated by the exhaust gas during this process, is cooled by the cooling water flowing through the first exhaust guide cooling water jacket JM1 and the exhaust manifold cooling water jacket JM2.

The cooling water having a slightly increased temperature after flowing upward through the first exhaust guide cooling water jacket JM1 and the exhaust manifold cooling water jacket JM2 branches from the coupling 61*d* provided at the upper end of the exhaust manifold 61 into the two water supply pipes 70 and 71 via the water supply pipe 68 and the branching member 69, and flows into the lower part and the upper part of the side face of the cylinder block cooling water jacket JB via the couplings 11*a* and 11*b* provided on the cylinder block 11. During this process, part of the low temperature cooling water of the cooling water passages 36*b* and 35*a* flows into the lower end of the cylinder block cooling water jacket JB via the two through holes 11*d* and 11*e* that open in the cooling water passage 11*c* at the lower end of the cylinder block 11. Furthermore, part of the low temperature cooling water of the cooling water passages 36*b* and 35*a* flows from the cooling water passage 11*c* at the lower end of the cylinder block 11 into the lower end of the cylinder head cooling water jacket JH via the two cooling water passages 11*g* and 11*h*.

While the engine E is warming up, both the first thermostat 84 connected to the upper end of the cylinder block cooling water jacket JB and the second thermostat 85 connected to the upper end of the cylinder head cooling water jacket JH are closed, and the cooling water within the first exhaust guide cooling water jacket JM1, the exhaust manifold cooling water jacket JM2, the cylinder block cooling water jacket JB, and the cylinder head cooling water jacket JH is retained and does not flow, thereby promoting the warming up of the engine E. At this time, the cooling water pump 46 continues to rotate, but since cooling water leaks from around a rubber impeller of the cooling water pump 46, the cooling water pump 46 is substantially at idle.

When the temperature of cooling water increases after the warming up of the engine E is completed, the first and second thermostats 84 and 85 open, and the cooling water in the cylinder block cooling water jacket JB and the cooling water in the cylinder head cooling water jacket JH flow from the common coupling 87a of the thermostat cover 87 into the second exhaust guide cooling water jacket JM3 via the drain pipe 88 and the coupling 62h of the exhaust guide 62. The cooling water that has cooled the exhaust guide 62 while flowing through the second exhaust guide cooling water jacket JM3 is discharged into the exhaust chamber 63 after passing through the mount case 35 and the oil case 36 from top to bottom. When the rotational speed of the engine E increases and the internal pressure of the cooling water passages 36b and 35a reaches a predetermined value or above, the relief valve 51 opens and excess cooling water is discharged into the exhaust chamber 63.

The coupling 61e provided at the upper end of the exhaust manifold cooling water jacket JM2 of the exhaust manifold 61 is connected to the water check outlet 66 via the hose 65, and circulation of cooling water can be confirmed by the ejection of water from the water check outlet 66. Since the coupling 61e connected to the water check outlet 66 is provided at the upper end of the exhaust manifold cooling water jacket JM2, air that resides within the exhaust manifold cooling water jacket JM2 can be discharged from the water check outlet 66 together with the cooling water. In this way, since the air within the exhaust manifold cooling water jacket JM2 is discharged by utilizing the water check outlet 66, it is unnecessary to provide a special pipe for discharging air or a special air outlet, thereby contributing to reduction in the number of components and in the number of assembly steps.

Moreover, since the exhaust manifold 61 and the water check outlet 66 are provided on left and right sides of the outboard motor O, even when the water check outlet 66 is positioned lower than the exhaust manifold 61, enlarging the distance between the exhaust manifold 61 and the water check outlet 66 reduces the downward slope, thereby smoothly pushing air within the exhaust manifold 61 toward the water check outlet 66.

In the present embodiment, the exhaust manifold cooling water jacket JM2 communicates with the cylinder block cooling water jacket JB, and the flow rates of the cooling water flowing through the first exhaust guide cooling water jacket JM1, the exhaust manifold cooling water jacket JM2, and the cylinder block cooling water jacket JB are controlled by the first thermostat 84. If the first exhaust guide cooling water jacket JM1 and the exhaust manifold cooling water jacket JM2 did not communicate with the cylinder block cooling water jacket JB but were dead ends, it would be necessary to increase the diameter of the water check outlet 66 so as to discharge the entire amount of cooling water coming from the exhaust manifold cooling water jacket JM2, or to provide a cooling water outlet in addition to the water check outlet 66 so as to discharge the cooling water, and this would give rise to the problem that the flow rate of the cooling water would increase and the load of the cooling water pump 46 would increase. However, in accordance with the present embodiment, since the first exhaust guide cooling water jacket JM1 and the exhaust manifold cooling water jacket JM2 communicate with the cylinder block cooling water jacket JB, there is no need to wastefully discharge the cooling water that has passed through the first exhaust guide cooling water jacket JM1 and the exhaust manifold cooling water jacket JM2, thereby reducing the load of the cooling water pump 46.

Furthermore, the cylinder block cooling water jacket JB and the cylinder head cooling water jacket JH are independent from each other; low temperature cooling water is supplied directly to the cylinder head cooling water jacket JH which easily overheats during operation of the engine E; and the cooling water having an increased temperature after passing through the first exhaust guide cooling water jacket JM1 and the exhaust manifold cooling water jacket JM2 is supplied to the cylinder block cooling water jacket JB which is easily overcooled during operation of the engine E. Therefore, it is possible to cool the cylinder head 15 and the cylinder block 11 down to their appropriate temperatures, to maximizing the performance of the engine E. Moreover, since the thermostats 84 and 85 are provided in the cylinder block cooling water jacket JB and the cylinder head cooling water jacket JH respectively, changing individually the settings of the thermostats 84 and 85 enables the temperatures of the cooling water in the cylinder block cooling water jacket JB and the cylinder head cooling water jacket JH to be controlled independently and as desired.

If cooling water were supplied from the lower end of the cylinder block cooling water jacket JB, which extends vertically, and discharged from the upper end thereof, the temperature of the cooling water would become low in a lower part and high in an upper part, leading to a possibility that the cooling performance of the cylinder block cooling water jacket JB might be nonuniform in the vertical direction. However, in accordance with the present embodiment, the cooling water from the exhaust manifold cooling water jacket JM2 is supplied to the cylinder block cooling water jacket JB at two positions that are separated from each other in the vertical direction, and the cooling performance of the cylinder block cooling water jacket JB can therefore be made uniform in the vertical direction.

Even when fresh cooling water is supplied in response to a rapid increase in the rotational speed of the engine, the cooling water is supplied to the cylinder block cooling water jacket JB after the cooling water obtains a temperature increased while passing through the first exhaust guide cooling water jacket JM1 and the exhaust manifold cooling water jacket JM2. Therefore, any rapid change in the temperature around the combustion chambers 20 can be moderated.

Furthermore, supplying supplementary cooling water via the two through holes 11d and 11e to the lower end of the cylinder block cooling water jacket JB prevents the cooling water from residing within the cylinder block cooling water jacket JB, and further promotes the uniformity of the cooling performance. Moreover, since the through holes 11d and 11e are provided at the lower end of the cylinder block cooling water jacket JB, it is easy to deal with water remaining when the engine is stopped.

Furthermore, since supply of the cooling water from the cooling water passages 36b and 35a to the cylinder head cooling water jacket JH is not carried out via an external pipe but is carried out via the cooling water passages 11g and 11h formed in the cylinder block 11 and the gasket 56 between the cylinder head 11 and the cylinder head 15, not only is it unnecessary to specially assemble the cooling water passages 11g and 11h, but also the number of components can be reduced by omitting the external pipe. Moreover, since the cooling water passages 11g and 11h can be sealed by utilizing the gasket 56 clamped between the cylinder block 11 and the cylinder head 15, no special seal is needed, thus reducing the number of components. Moreover, since the cooling water passages 11g and 11h are provided at the lower end of the cylinder head cooling water jacket JH, it is easy to deal with water remaining when the engine is stopped.

In particular, since the two cooling water passages 11g and 11h for delivering cooling water from the cylinder block cooling water jacket JB to the cylinder head cooling water jacket JH are provided so as to be separated in the left and right directions, cooling water can be supplied evenly to the left and right sides of the cylinder head cooling water jacket JH, thereby improving the cooling effect. Moreover, since the oil return passage 11j for guiding oil returning from the cylinder head 15 is provided between the two cooling water passages 11g and 11h, the cooling water passages 11g and 11h and the oil return passage 11j provided in the lowest part of a cam chamber can be arranged compactly in a confined space, while preventing the flow rates of the cooling water flowing through the two cooling water passages 11g and 11h from becoming imbalanced.

Furthermore, since the through holes 11d and 11e communicating with the cylinder block cooling water jacket JB and the cooling water passages 11g and 11h communicating with the cylinder head cooling water jacket JH are branched in the cooling water passage 11c which is a branching part formed within the cylinder block 11, it is unnecessary to provide a special seal in the branching part, thereby reducing the number of components.

When the temperature of the cooling water increases abnormally during operation of the engine E, an alarm is raised for the possibility that the engine E might overheat. In the present embodiment, the cooling water temperature sensor 67 for the cooling system comprising the first exhaust guide cooling water jacket JM1, the exhaust manifold cooling water jacket JM2, and the cylinder block cooling water jacket JB is provided at the upper end of the exhaust manifold cooling water jacket JM2, and the cooling water temperature sensor 89 for the cooling system comprising the cylinder head cooling water jacket JH is provided in the vicinity of the second thermostat 85.

In this way, a total of four water jackets, that is, the first exhaust guide cooling water jacket JM1, the exhaust manifold cooling water jacket JM2, the cylinder block cooling water jacket JB, and the cylinder head cooling water jacket JH, are divided into two systems. Therefore, it is only necessary to provide one cooling water temperature sensor 67 for the first exhaust guide cooling water jacket JM1, the exhaust manifold cooling water jacket JM2, and the cylinder block cooling water jacket JB. Thus, the number of components can be reduced in comparison with a case in which each of the four water jackets is provided with a cooling water temperature sensor.

In particular, since, among the first exhaust guide cooling water jacket JM1, the exhaust manifold cooling water jacket JM2, and the cylinder block cooling water jacket JB, the cooling water temperature sensor 67 is provided in the exhaust manifold cooling water jacket JM2 in upstream of the cylinder block cooling water jacket JB, an abnormal increase in the temperature of the cooling water can be detected promptly. Furthermore, since the cooling water temperature sensor 67 of the exhaust manifold cooling water jacket JM2 is provided in the vicinity of the coupling 61e connected to the water check outlet 66, the flow of cooling water toward the water check outlet 66 can prevent the cooling water from residing in the vicinity of the cooling water temperature sensor 67, thereby improving the accuracy with which the temperature of the cooling water is detected.

The first thermostat 84 for controlling the discharge of cooling water from the cylinder block cooling water jacket JB and the second thermostat 85 for controlling the discharge of cooling water from the cylinder head cooling water jacket JH are provided on the upper wall of the chain cover 31 that covers the timing chain 30 which provides connections between the crankshaft 13 and the camshafts 73 and 74 on the upper face of the engine E. Therefore, the first and second thermostats 84 and 85 can easily be serviced from above by removing only the engine cover 40 without being obstructed by the chain cover 31 or the timing chain 30.

Furthermore, since the cooling water passages 31b and 31c providing a connection between the cylinder block cooling water jacket JB and the first thermostat 84 and the cooling water passages 31d and 31e providing a connection between the cylinder head cooling water jacket JH and the second thermostat 85 are formed in the chain cover 31, the number of components can be reduced in comparison with a case in which connection is carried out via external pipes. Moreover, since the outlet sides of the first and second thermostats 84 and 85 are connected to the second exhaust guide cooling water jacket JM3 via the common drain pipe 88, not only is it unnecessary to form in the interior of the engine E a passage through which cooling water is discharged, thus making machining easy, but also only one drain pipe 88 is required, thereby reducing the number of components.

Furthermore, since the first thermostat 84 on the cylinder block 11 side and the second thermostat 85 on the cylinder head 15 side are arranged in proximity to each other, and the first and second thermostats 84 and 85 are mounted on the chain cover 31, which is joined to the cylinder block 11 and the cylinder head 15 via the common gasket face, it is possible to mount the first and second thermostats 84 and 85 compactly in a confined space. In particular, since the thermostat chambers 94 and 95 housing the first and second thermostats 84 and 85 are positioned above the plane in which the timing chain 30 rotates, it is possible to avoid any mutual interference, thereby preventing any increase in the dimensions and achieving a compact arrangement. Moreover, the cooling water passages 31b and 31d communicating with the thermostat chambers 94 and 95 are disposed within the loop of the timing chain 30, so that dead space can be utilized effectively, and it is possible to prevent any increase in the dimensions to achieve a compact arrangement while avoiding any mutual interference.

Furthermore, since cooling water is discharged from the highest part of the cylinder block cooling water jacket JB and the highest part of the cylinder head cooling water jacket JH, the discharge of cooling water is easy.

Moreover, since the upper side coupling 11a for supplying cooling water to the cylinder block cooling water jacket JB is provided not at the side of the highest combustion chamber 20 but at the side of the second from highest combustion chamber 20, it is possible to prevent the first thermostat 84 from operating inappropriately due to low temperature cooling water supplied from the coupling 11a acting on the first thermostat 84. In addition, in order to make the first thermostat 84 operate appropriately, the coupling 11a should be positioned at least lower than the vertically middle position of the highest combustion chamber 20.

An embodiment of the present invention is explained above, but the present invention is not limited to the above-mentioned embodiment and can be modified in a variety of ways without departing from the spirit and scope of the present invention.

For example, in the embodiment, a vertical engine E is illustrated, but the present invention can also be applied to an engine other than a vertical engine.

Furthermore, in the embodiment, the highest part of the exhaust manifold cooling water jacket JM2 is connected to the water check outlet 66, but it can be connected to any other opening as long as the opening communicates with the outside at least when the engine E is running.

Moreover, the flow control means is not limited to the first thermostat 84 of the embodiment.

Furthermore, the combustion chamber cooling water jacket is not limited to the cylinder block cooling water jacket JB of the embodiment, and may be the cylinder head cooling water jacket JH.

What is claimed is:

1. An outboard motor equipped with a water-cooled engine comprising:
    a combustion chamber;
    exhaust passage means for discharging to the outside exhaust gas from the combustion chamber, the exhaust passage means comprising an exhaust manifold having single pipe sections and a combined section, said single pipe sections and said combined section being connected together so as to extend in a longitudinal direction of the outboard motor;
    an exhaust manifold cooling water jacket for cooling the exhaust manifold; and
    a cooling water pump for supplying cooling water to the exhaust manifold cooling water jacket;
    wherein a water outlet is provided in the highest part of the exhaust manifold cooling water jacket, and communicates with an opening that communicates with the outside at least when the engine is running, and
    wherein a further water outlet is provided in the exhaust manifold cooling water jacket, said water outlet and said further water outlet being provided around a portion of said exhaust manifold extending in the longitudinal direction of the outboard motor such that one of the water outlets is in front of the other of the water outlets in the longitudinal direction.

2. The outboard motor equipped with a water-cooled engine according to claim 1 wherein the opening is a water check outlet for confirming the circulation of cooling water.

3. An outboard motor equipped with a water-cooled engine comprising:
    a combustion chamber;
    exhaust passage means for discharging to the outside exhaust gas from the combustion chamber;
    an exhaust manifold forming the exhaust passage means;
    an exhaust manifold cooling water jacket for cooling the exhaust manifold;
    a combustion chamber cooling water jacket that is connected to a downstream side of the exhaust manifold cooling water jacket and that cools the surroundings of the combustion chamber; and
    a cooling water pump for supplying cooling water to the water jackets;
    wherein a water outlet is provided in the exhaust manifold cooling water jacket, and communicates with an opening that communicates with the outside at least when the engine is running; and
    wherein flow rate control means for controlling the flow rate of the cooling water is provided in the combustion chamber cooling water jacket.

4. An outboard motor epuipped with a water-cooled engine comprising:
    a combustion chamber;
    exhaust passage means for discharging to the outside exhaust gas from the combustion chamber, the exhaust passage means comprising an exhaust manifold;
    an exhaust manifold cooling water jacket for cooling the exhaust manifold; and
    a cooling water pump for supplying cooling water to the exhaust manifold cooling water jacket;
    wherein a water outlet is provided in the highest part of the exhaust manifold cooling water jacket, and communicates with an opening that communicates with the outside at least when the engine is running,
    wherein the exhaust manifold is provided on one of the left and right sides of the outboard motor, and the opening is provided on the other side of the outboard motor.

5. An outboard motor equipped with a water-cooled engine comprising:
    a combustion chamber;
    exhaust passage means for discharging to the outside exhaust gas from the combustion chamber;
    an exhaust manifold forming the exhaust passage means;
    an exhaust manifold cooling water jacket for cooling the exhaust manifold;
    a combustion chamber cooling water jacket that is connected to a downstream side of the exhaust manifold cooling water jacket and that cools the surroundings of the combustion chamber; and
    a cooling water pump for supplying cooling water to the water jackets;
    wherein a water outlet is provided in the exhaust manifold cooling water jacket, and communicates with an opening that communicates with the outside at least when the engine is running;
    wherein flow rate control means for controlling the flow rate of the cooling water is provided in the combustion chamber cooling water jacket, and
    wherein the exhaust manifold is provided on one of the left and right sides of the outboard motor, and the opening is provided on the other side of the outboard motor.

6. An outboard motor equipped with a water-cooled engine comprising:
    a combustion chamber;
    exhaust passage for discharging to the outside exhaust gas from the combustion chamber, the exhaust passage comprising an exhaust manifold having single pipe sections and a combined section, said single pipe sections and said combined section being connected together so as to extend in a longitudinal direction of the outboard motor;

an exhaust manifold cooling water jacket for cooling the exhaust manifold; and a cooling water pump for supplying cooling water to the exhaust manifold cooling water jacket;

wherein a water outlet is provided in the highest part of the exhaust manifold cooling water jacket, and communicates with an opening that communicates with the outside at least when the engine is running, and wherein a further water outlet is provided in the exhaust manifold cooling water jacket, said water outlet and said further water outlet being provided around a portion of said exhaust manifold extending in the longitudinal direction of the outboard motor such that one of the water outlets is in front of the other of the water outlets in the longitudinal direction.

\* \* \* \* \*